US012574304B2

(12) United States Patent
Li et al.

(10) Patent No.: US 12,574,304 B2
(45) Date of Patent: Mar. 10, 2026

---

(54) SIXTH GENERATION (6G) SYSTEM ARCHITECTURE AND FUNCTIONS

(71) Applicant: Intel Corporation, Santa Clara, CA (US)

(72) Inventors: Qian Li, Beaverton, OR (US); Zongrui Ding, Portland, OR (US); Geng Wu, Portland, OR (US); Sangeetha L Bangolae, Portland, OR (US); Sudeep Palat, Cheltenham (GB); Alexandre Saso Stojanovski, Paris (FR); Thomas Luetzenkirchen, Taufkirchen BY (DE); Ching-Yu Liao, Portland, OR (US); Abhijeet Kolekar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 18/550,401

(22) PCT Filed: Jul. 11, 2022

(86) PCT No.: PCT/US2022/036662
§ 371 (c)(1),
(2) Date: Sep. 13, 2023

(87) PCT Pub. No.: WO2023/287696
PCT Pub. Date: Jan. 19, 2023

(65) Prior Publication Data
US 2024/0154883 A1 May 9, 2024

Related U.S. Application Data

(60) Provisional application No. 63/220,791, filed on Jul. 12, 2021.

(51) Int. Cl.
G06F 15/167 (2006.01)
H04L 41/5051 (2022.01)
H04L 67/1097 (2022.01)

(52) U.S. Cl.
CPC ...... *H04L 41/5051* (2013.01); *H04L 67/1097* (2013.01)

(58) Field of Classification Search
CPC ...... H04L 41/5051; H04W 4/04; H04W 4/08; H04W 4/18
See application file for complete search history.

(56) References Cited

U.S. PATENT DOCUMENTS 10,063,415 B1 * 8/2018 Kanakarajan ....... H04L 41/0806
10,511,675 B1 12/2019 Chud
(Continued)

FOREIGN PATENT DOCUMENTS

JP 2016-82569 A 5/2016

OTHER PUBLICATIONS

Japanese Patent Office—Notice of Reasons for Rejection mailed Oct. 22, 2024, from JP Patent Application No. 2023-551972, 4 pages.
(Continued)

*Primary Examiner* — Yves Dalencourt
(74) *Attorney, Agent, or Firm* — Schwegman Lundberg & Woessner, P.A.

(57) ABSTRACT

Various embodiments herein provide techniques related to sixth generation (6G) system architecture and functions. For example, embodiments may relate to one or more of: Design principle and system architecture; Orchestration frontend service; Dynamic device-network computing scaling; RDMA over radio; Cloud workload offloading to network; Computing-embedded air interface; Service chain aware
(Continued)

transport; and/or Enabling AI capabilities. Other embodiments may be described and/or claimed.

19 Claims, 26 Drawing Sheets

(56)                    References Cited

U.S. PATENT DOCUMENTS

| | | | | |
|---|---|---|---|---|
| 2011/0138050 | A1* | 6/2011 | Dawson | H04L 67/63 |
| | | | | 709/226 |
| 2015/0081837 | A1* | 3/2015 | Bernier | H04W 4/80 |
| | | | | 709/217 |
| 2018/0352600 | A1* | 12/2018 | Wu | H04W 24/10 |
| 2018/0359323 | A1* | 12/2018 | Madden | H04L 12/4633 |
| 2019/0372914 | A1* | 12/2019 | Ganguli | G06F 30/34 |
| 2021/0144517 | A1* | 5/2021 | Guim Bernat | G06F 9/5072 |
| 2022/0107895 | A1* | 4/2022 | Holmberg | H04L 67/10 |

OTHER PUBLICATIONS

Ericsson, "Solution 5 update," 3GPP SA WG2 Meeting #129, S2-1811295, Agenda Item: 6.19, Oct. 15-19, 2018, Dongguan, China, 23 pages.

International Patent Office—International Search Report and Written Opinion mailed Feb. 9, 2023, from International Patent Application No. PCT/US2022/036662, 13 pages.

Shantharama, et al., "LayBack: SDN Management of Multi-Access Edge Computing (MEC) for Network Access Services and Radio Resource Sharing," IEEE Access, Digital Object Identifier 10.1109/ACCESS.2018.2873984, vol. 6, 2018, accepted Sep. 29, 2018, date of publication Oct. 8, 2018, date of current version Oct. 29, 2018, 17 pages.

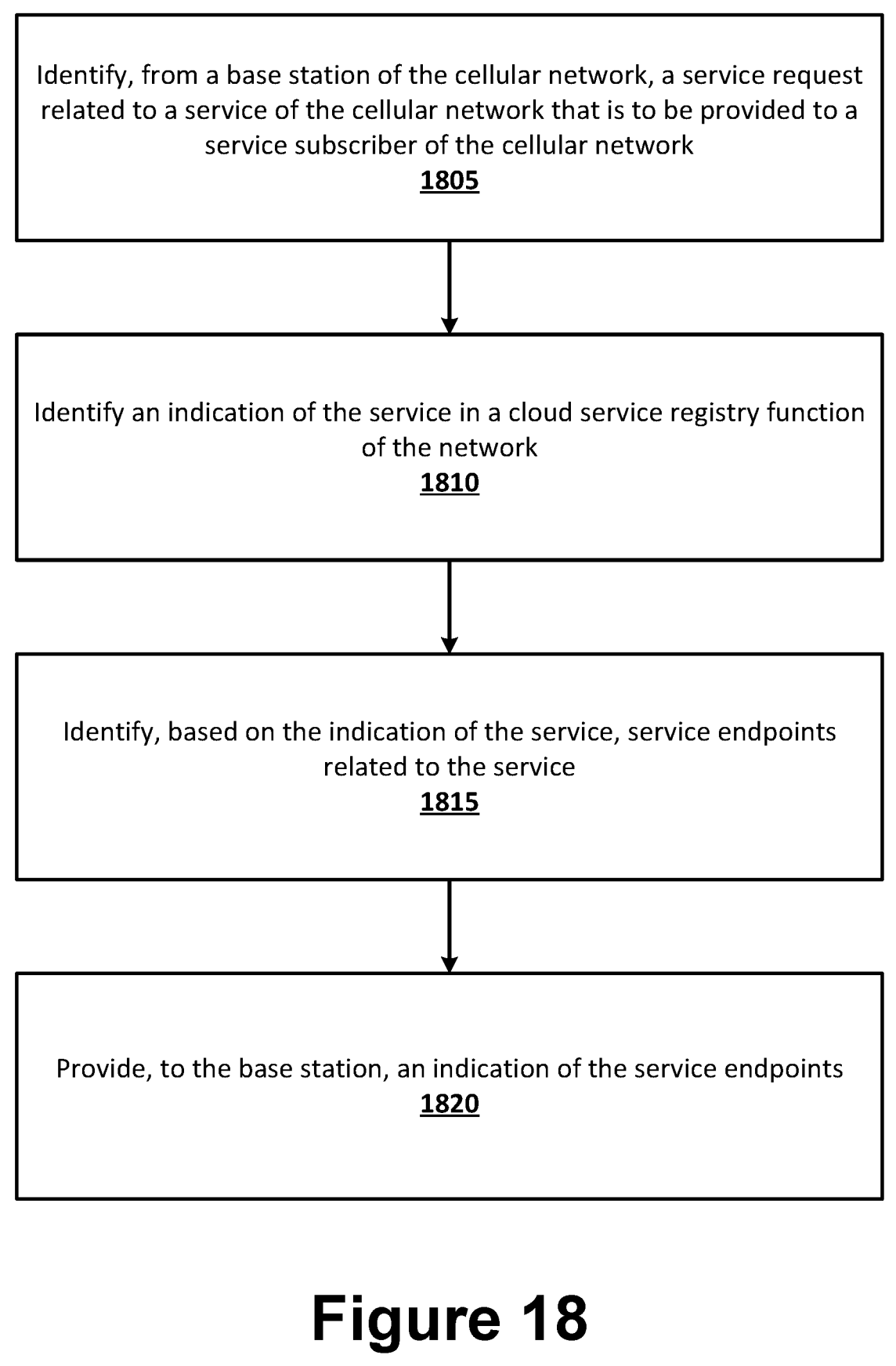

* cited by examiner (a) CP protocol stack (b) UP protocol stack (a) CP protocol stack (b) UP protocol stack Identify, from a base station of the cellular network, a service request related to a service of the cellular network that is to be provided to a service subscriber of the cellular network
1805

Identify an indication of the service in a cloud service registry function of the network
1810

Identify, based on the indication of the service, service endpoints related to the service
1815

Provide, to the base station, an indication of the service endpoints
1820

Figure 18

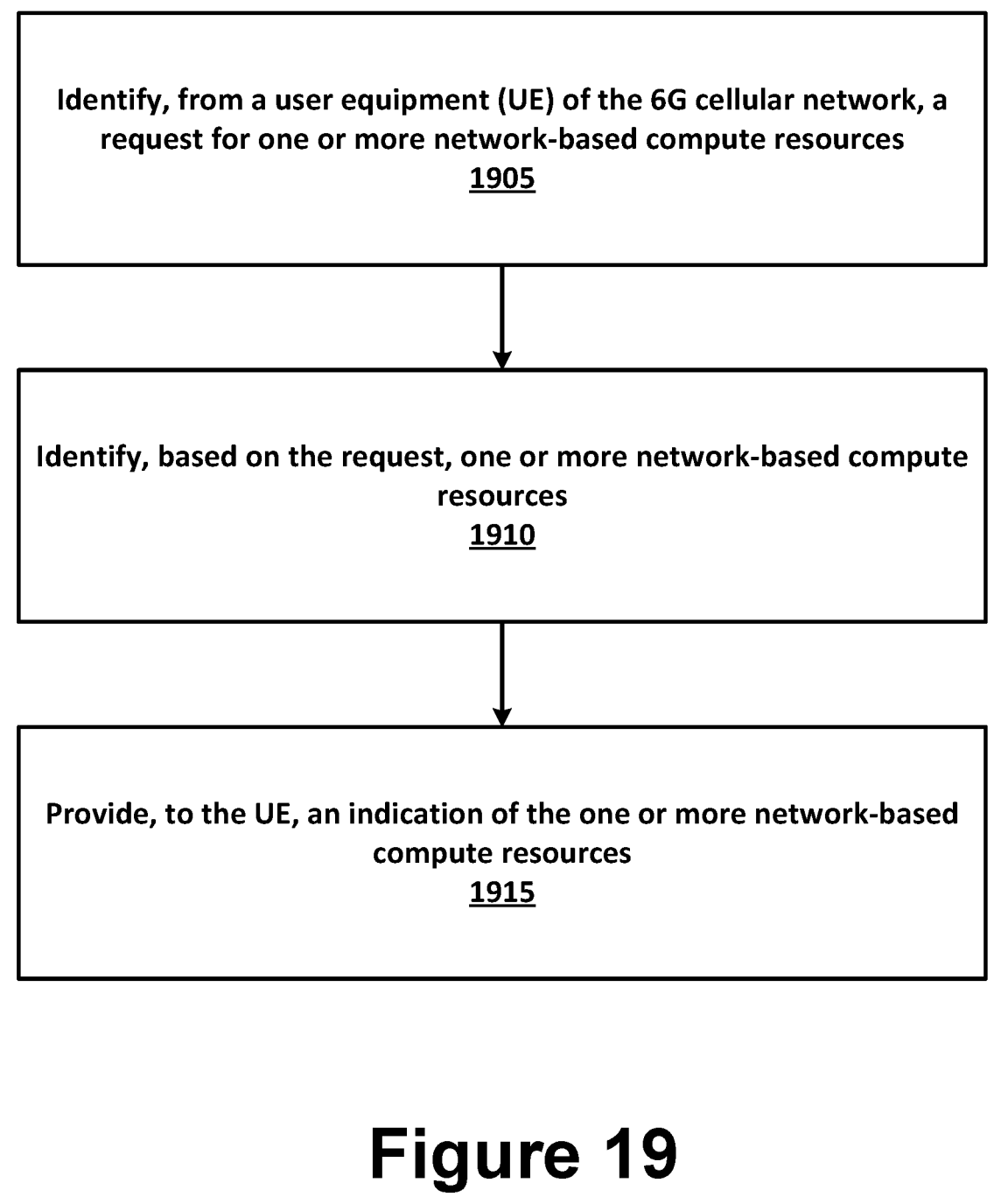

Identify, from a user equipment (UE) of the 6G cellular network, a request for one or more network-based compute resources
1905

Identify, based on the request, one or more network-based compute resources
1910

Provide, to the UE, an indication of the one or more network-based compute resources
1915

Figure 19

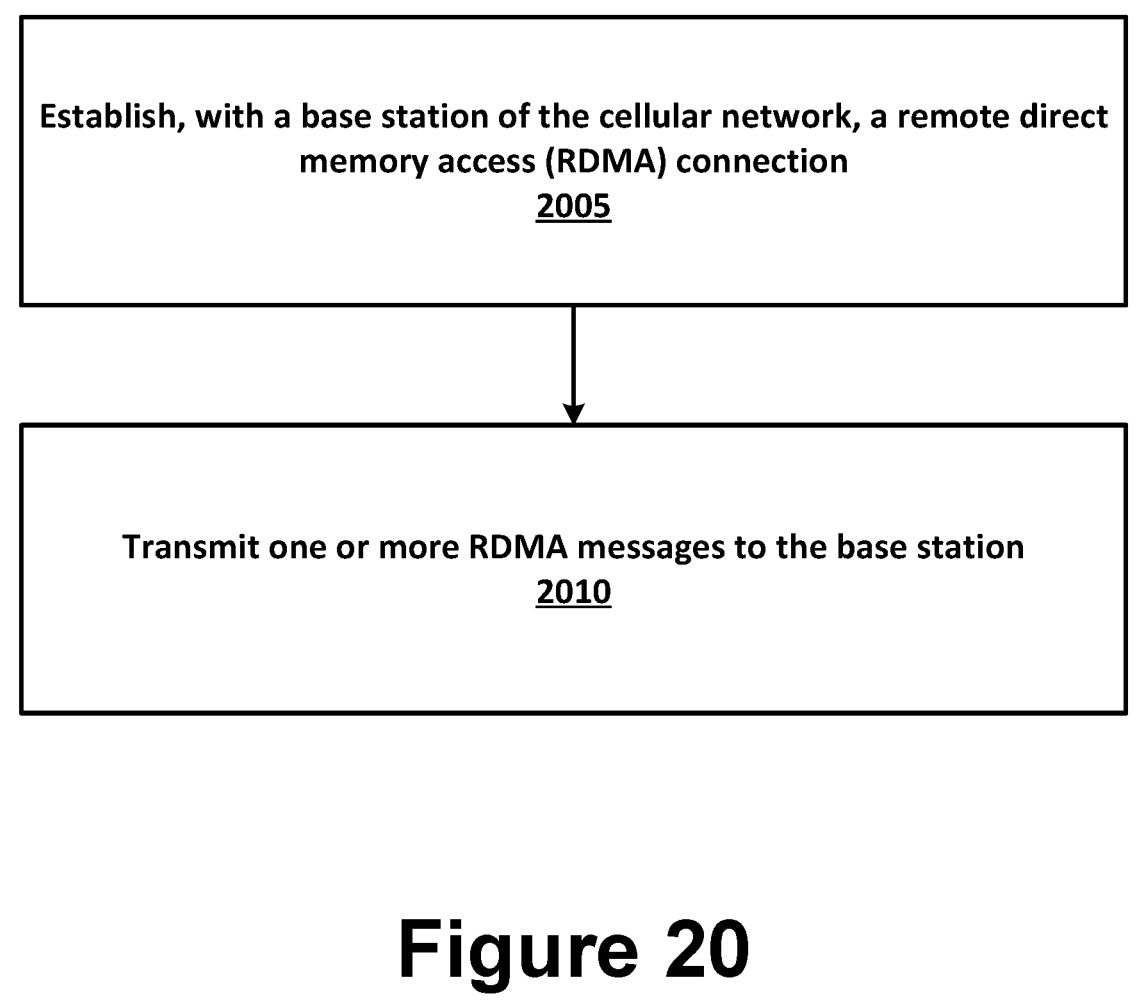

Establish, with a base station of the cellular network, a remote direct memory access (RDMA) connection
2005

Transmit one or more RDMA messages to the base station
2010

Figure 20

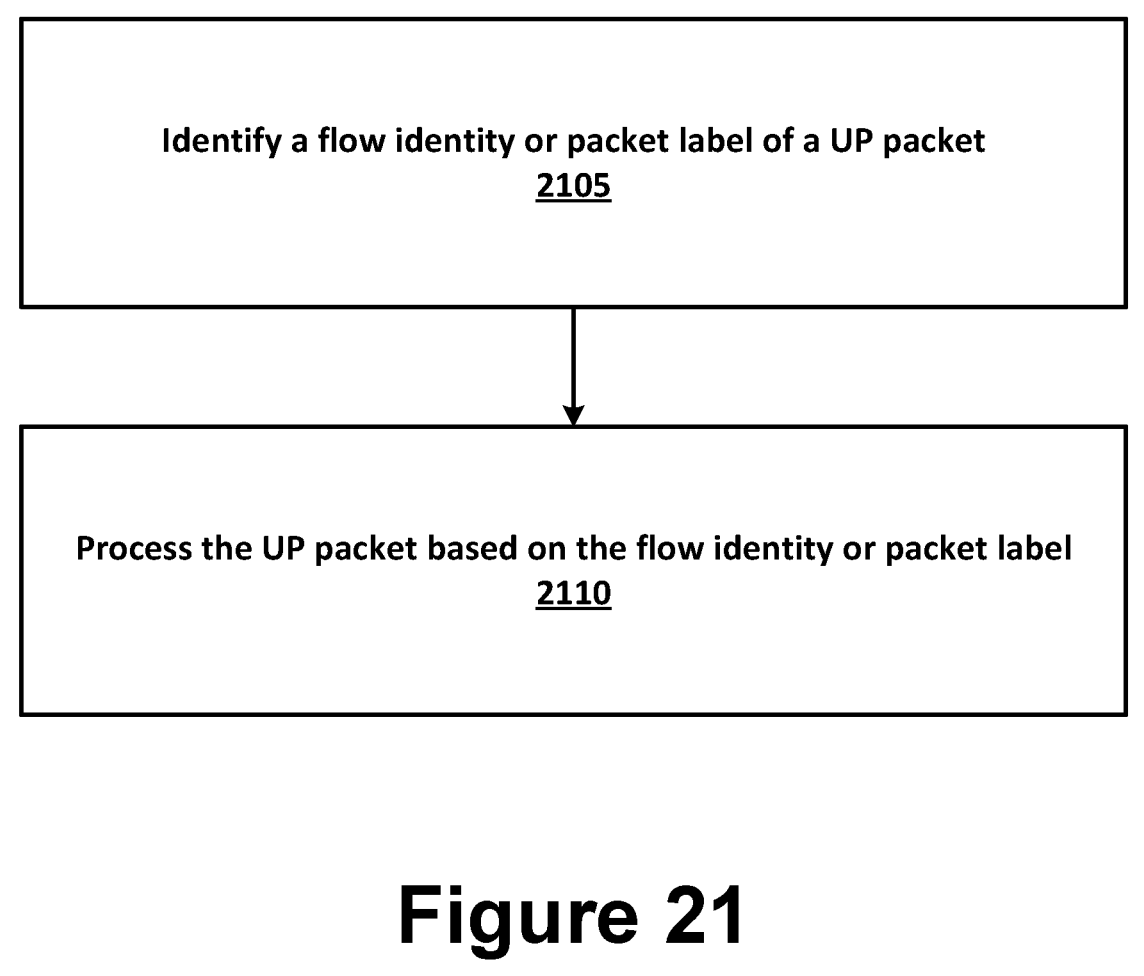

Identify a flow identity or packet label of a UP packet
2105

Process the UP packet based on the flow identity or packet label
2110

Figure 21

SIXTH GENERATION (6G) SYSTEM ARCHITECTURE AND FUNCTIONS

CROSS REFERENCE TO RELATED APPLICATION

The present application is a national phase entry under 35 U.S.C. § 371 of International Application No. PCT/US2022/036662, filed Jul. 11, 2022, entitled "SIXTH GENERATION (6G) SYSTEM ARCHITECTURE AND FUNCTIONS," which claims priority to U.S. Provisional Patent Application No. 63/220,791, which was filed Jul. 12, 2021, the entire disclosures of which are hereby incorporated by reference.

FIELD

Various embodiments generally may relate to the field of wireless communications. For example, some embodiments may relate to sixth generation (6G) system architecture and functions.

BACKGROUND

Various embodiments generally may relate to the field of wireless communications.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 18 illustrates an example technique, in accordance with various embodiments herein.

FIG. 19 illustrates an alternative example technique, in accordance with various embodiments herein.

FIG. 20 illustrates an alternative example technique, in accordance with various embodiments herein.

FIG. 21 illustrates an alternative example technique, in accordance with various embodiments herein.

DETAILED DESCRIPTION

Figure 1:
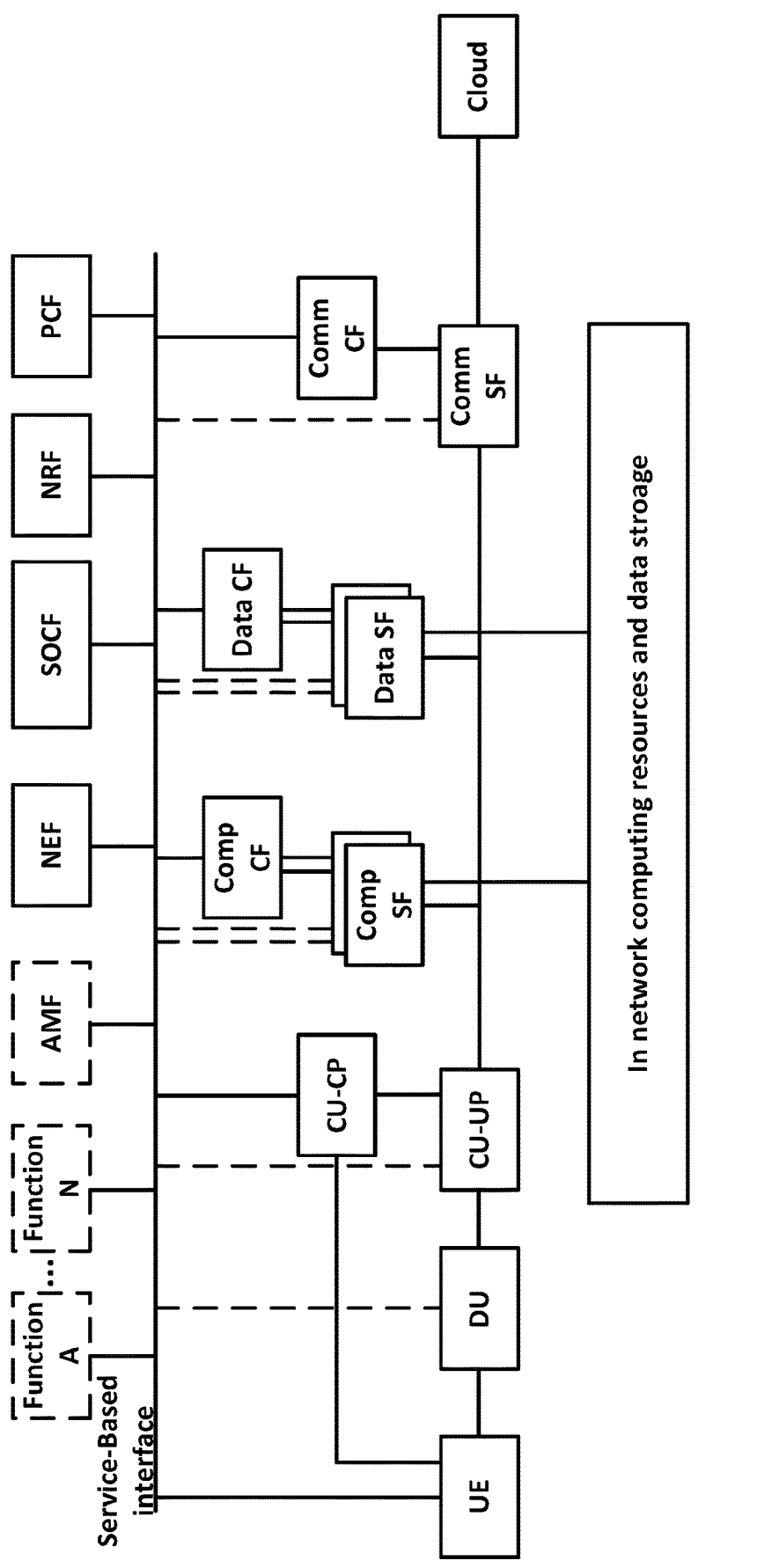
FIG. 1 depicts an example high-level illustration on the system architecture, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

With the evolving trends on data, application, computing and communication, it may be desirable to address one or more of the following questions:

How to further reduce latency

How to distribute and chain up a data processing pipeline across device, network, cloud How to enable data sharing across security domains How to enable distributed computing at scale

How to dynamically scale out computing for user equipments (UEs)

How to leverage artificial intelligence/machine learning (AI/ML) for network and air interface How to cost efficiently address diverse vertical requirements To address those gaps, a network system such as a sixth generation (6G) system may provide for or relate to one or more of the following:

Order-of-magnitude improvement on air interface and network performance. Example performance indicators may include or relate to: Peak data rate, area throughput, latency, jitter, energy consumption, etc.

Communication for computing, for example by enabling distributed computing and intelligence at scale and/or enabling dynamic device-network/cloud computing scaling out Computing for communication, for example by using AI/ML for the network air interface and/or wired communication Cloud-native network such as one that includes or uses disaggregated and composable network functions and services or that provides native support on computing and data services Sustainability and resilience. For example, the 6G system may include functions to decrease energy consumption and/or achieve carbon neutrality.

Security, privacy and data integrity

Various embodiments herein describe a system architecture and key capabilities to achieve the 6G design goals. Specifically, various embodiments provide a 6G system architecture and service capabilities. In some embodiments, the system architecture includes one or more of compute service plane functions, communication service plane functions, data service plane functions, and service orchestration and chaining function. Service capabilities may include one or more of: orchestration frontend service, dynamic device-network computing scaling, RDMA over radio, cloud workload offloading, computing-embedded air interface, service chain aware transport, and AI capabilities.

1. Design Principle and System Architecture

One or more of the following principles may be applied in embodiments of the 6G system design described herein:

Introduce three service planes: Compute Plane, Data Plane and Communication Plane to provide computing, data and communication services, respectively.

Introduce three function planes: Control plane (CP), User plane (UP), and Management Plane (MP) to provide control, user and management functions, respectively.

Each of the Compute Plane, Data Plane and Communication Plane may have corresponding Control Plane functions, User Plane functions and Management Plane functions. The services provided by the service planes may be achieved via CP functions, UP functions and MP functions.

The CP functions and UP functions may be operated with a clear functional split. This split may allow CP functions and UP functions to scale independently.

Use a service-based interface (SBI) to connect CP functions and some of the UP functions.

Use dedicated high-speed transport to connect UP functions.

Use CP functions to discover/grant computing resources/services, chain up and configure computing and data service paths and functions, authorize access, etc.

Keep data in the UP functions and enable direct data access via a configured data access path, which may reduce or minimize data movement.

Use the Management Plane to deploy/onboard new services, provision for new services, monitor performance, manage system failures, optimize system performance.

FIG. 1 depicts an example high-level illustration on the system architecture, in accordance with various embodiments. Specifically, the system architecture showed in FIG. 1 provides a high-level representation of the design principles. Various functions in the system architecture of FIG. 1 may be as follows:

The Compute Control Function (Comp CF) and the Compute Service Function (Comp SF) are part of the Compute Plane. Comp CF is a CP function that may provide functionalities such as expose compute services to devices and other system functions, compute service request admission control and service establishment, identify and assign Comp SF for a computing service request, control and configure Comp SF, maintain compute service context and status, manage security of the compute services such as allocate/maintain/update/delete security keys, memory access keys, manage compute sessions, and coordinate the communication and compute planes which may be related to different network slices, etc. Comp SF is a UP function and is the gateway for devices and other system functions to access computing services and resources. Functionalities of Comp SF may include: parse computing service requests, direct requests to corresponding computing service endpoints, generate service request responses, generate charging data, report compute service status, etc.

The Data Control Function (Data CF) and the Data Service Function (Data SF) may be considered to be part of the Data Plane. Data CF is a CP function and may provide functionalities such as: expose data services to devices and other system functions, data service request admission control and service establishment, identify and assign Data SF for a data service request, control and configure Data SF, maintain data service context and status, etc. Data SF is a UP function that may provide functionalities such as: parse data service request, direct requests to corresponding data service endpoints, generate service request responses, generate charging data, report data service status, etc.

The Communication Control Function (Comm CF), the Communication Service Function (Comm SF), the Central Unit Control Plane (CU-CP), the Central Unit User Plane (CU-UP) and the Distributed Unit (DU) are part of the Communication Plane. Specifically, CU-CP, CU-UP, and DU are part of the radio access network (RAN). The RAN functions provide protocols and services in support of computing and data plane services as well as conventional communication plane protocols and services. The Comm CF and Comm SF are part of the core network (CN) and provide CP and UP functions for data transport in the CN. To support computing and data plane services, service-aware transport may be enabled in Comm CF and Comm SF.

A Service Orchestration and Chaining Function (SOCF) may discover and chain up services provided by functions in the network. A service pipeline is created by a chain of services. Workload processing and data movement may then be done within the service pipeline.

Additional service-specific CP functions can be defined to provide Compute Plane, Data Plane or Communication Plane services. Examples of such CP functions include: a network intelligent control function, a data ledger control function, etc.

The functions shown in the system architecture may be considered to be logical functions.

The instances of one or more of these functions may be instantiated in deployment.

2. Service Capabilities

Capability #1: Orchestration Frontend Service

Figure 2:
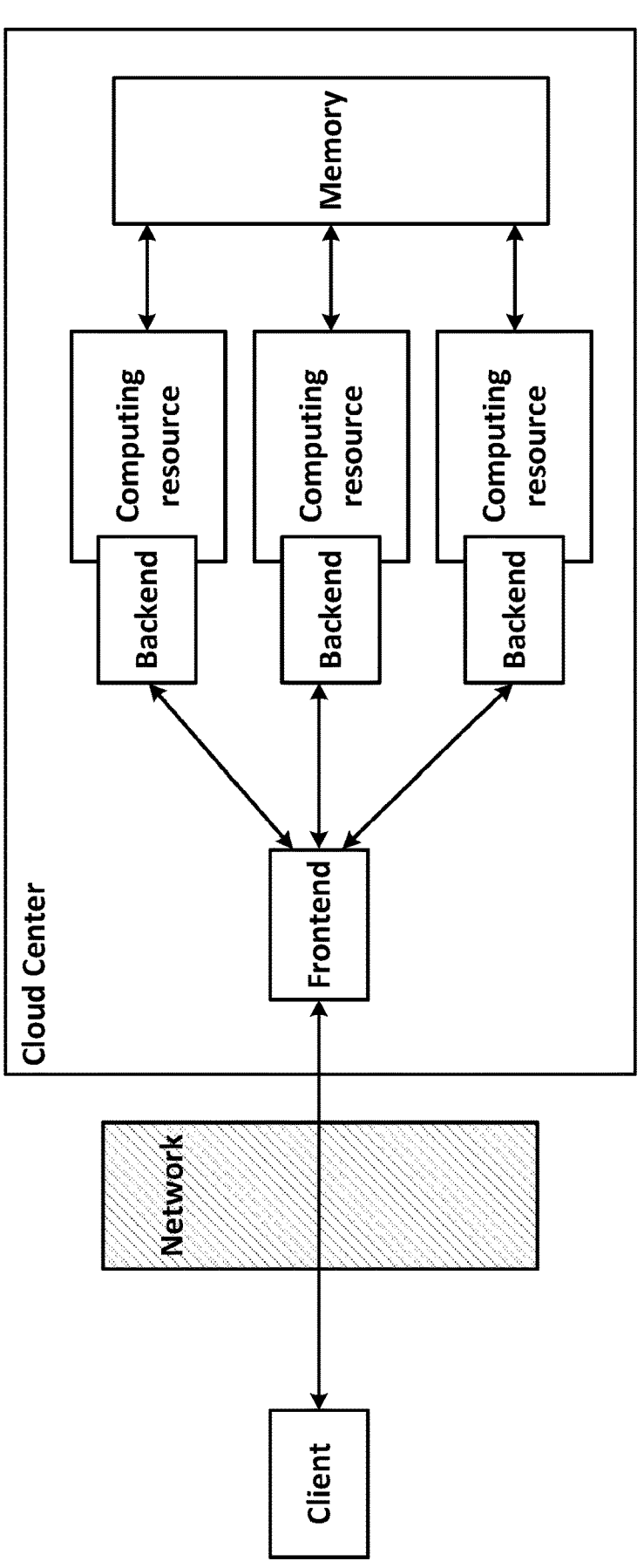
FIG. 2 illustrates an example scheme for accessing computing resources/services hosted in data centers.
Figure 3:
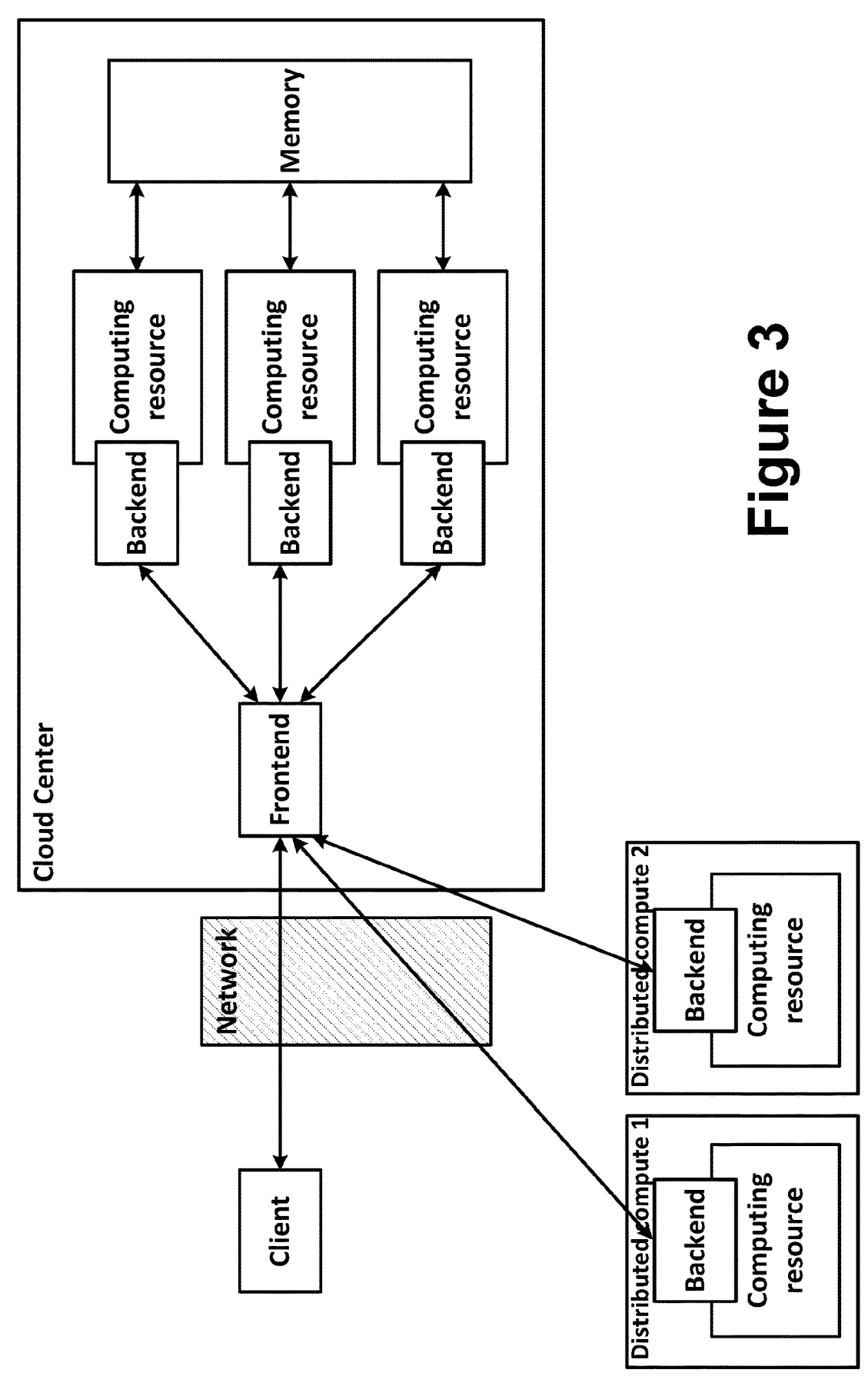
FIG. 3 illustrates an example scheme for accessing computing resources/services hosted in cloud center and cloud edges.

One factor related to distributing computing from cloud center to cloud edge to network edge is computing resource/service discovery and association. In present schemes, the computing resource/service discovery and orchestration may be managed in cloud center. FIG. 2 and FIG. 3 illustrate an example scheme for accessing computing resources/services hosted in data centers and accessing computing services/resource hosted in distributed locations, respectively. Specifically, FIG. 2 illustrates an example scheme for accessing computing resources/services hosted in data centers. FIG. 3 illustrates an example scheme for accessing computing resources/services hosted in cloud center and cloud edges.

The schemes of FIGS. 2 and 3 related to distributed computing resource/service access may be considered to be an extension of the conventional data center service access approach. The frontend function (which receives and parses computing service requests and select a proper backend to serve a request) located in data centers may manage the access to all computing resources and services, both locally in cloud centers and remotely in distributed computing locations. The network may generally provide service agnostic connectivity. The scheme can work if the distributed computing locations are in a few regional cloud edge locations. However, with computing resources becoming further distributed to the network (RAN) edges, e.g., to multiple base stations and radio access points, the scheme of central access management may suffer from scalability and performance issues. This issue may be even more complicated when computing resources belong to different cloud service providers (CSPs) and communication service providers (CoSPs).

Figure 4:
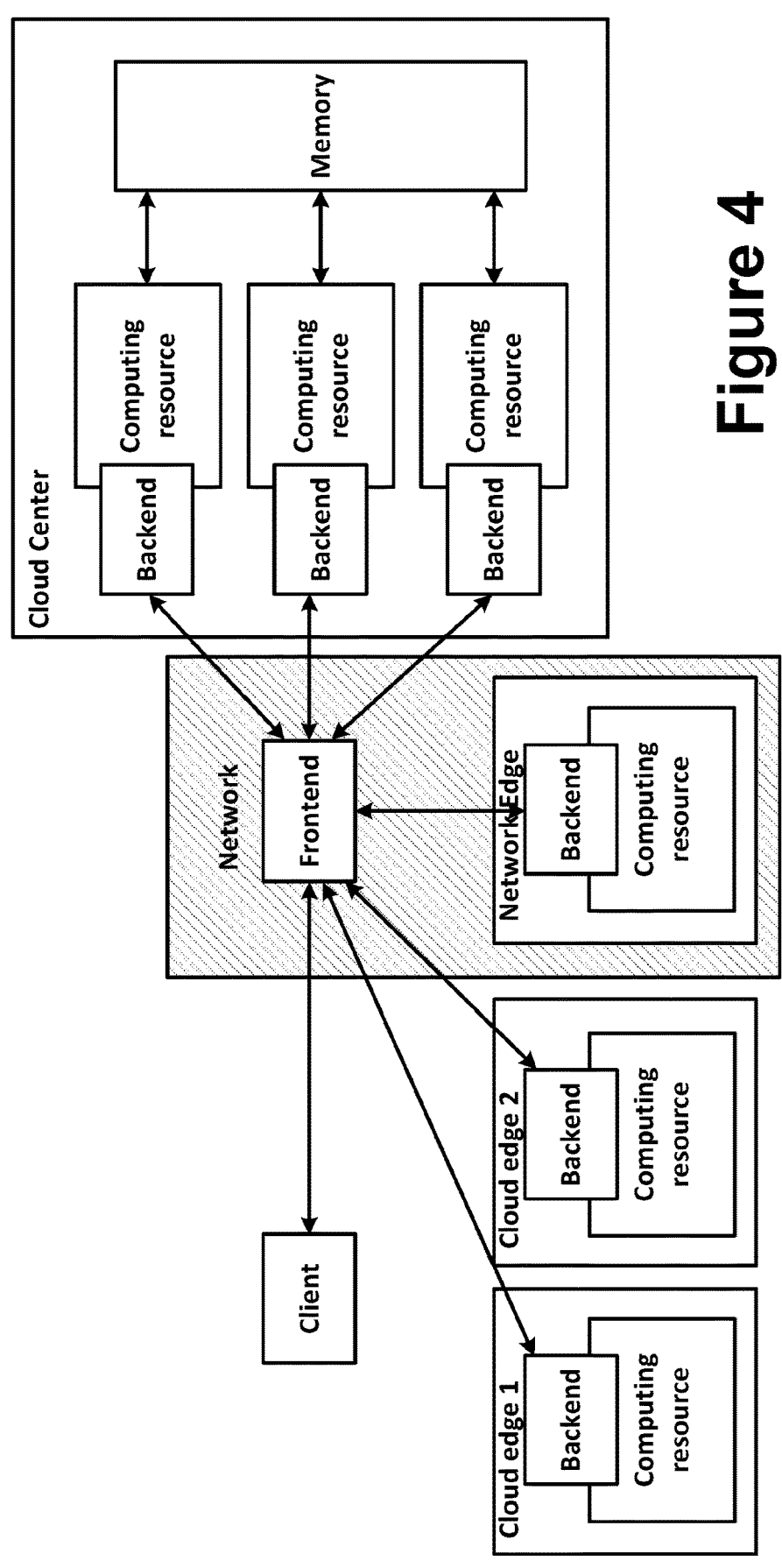
FIG. 4 illustrates an example front-end service in at network for computing resource/service discovery and association across cloud center, cloud edge(s), and network edge(s), in accordance with various embodiments.

To address those issues, the network can provide the frontend service to enable computing service and resource discovery and association across cloud center, cloud edge and network edge as illustrated in FIG. 4. Specifically, FIG. 4 illustrates an example front-end service in at network for computing resource/service discovery and association across cloud center, cloud edge(s), and network edge(s), in accordance with various embodiments.

Figure 5:
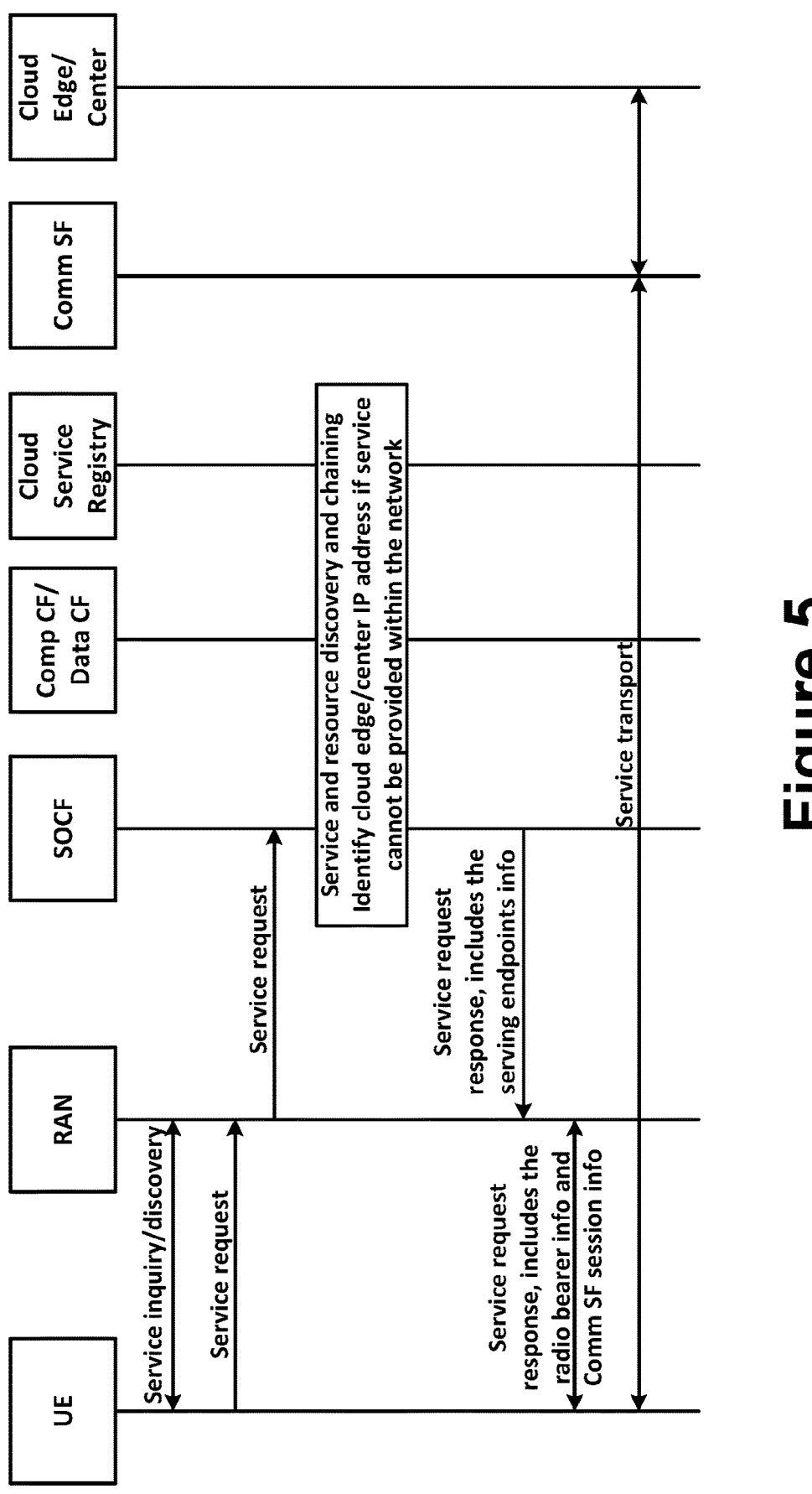
FIG. 5 illustrates an example procedure for providing frontend service in the network, in accordance with various embodiments.

The in-network frontend service can be part of the services provided by SOCF. FIG. 5 shows one example procedure. Specifically, FIG. 5 illustrates an example procedure for providing frontend service in the network, in accordance with various embodiments.

In the procedure, when receiving a service request, the SOCF looks for available services within the network and in the cloud. The computing and data services provided by the network may be discovered from Comp CF and Data CF. The computing and data services provided by the cloud are registered in the Cloud Service Registry function in the network. Once identified endpoints for the requested service (either provided by services instantiated in Comp SF and/or Data SF in network or provided by services instantiated in the cloud edge/center), the SOCF responds to the service request with information on the service endpoints. In the example in FIG. 5, the service endpoints are in the cloud therefore a service transport is established between device and cloud through Comm SF as a gateway.

Capability #2: Dynamic Device-Network Computing Scaling

For scaling out device computing, legacy systems may use client-server applications where workloads are pre-partitioned into client-side and server-side applications during application development phase. The scheme may be application dependent, and the workload partition between device and cloud may be fixed. For dynamic workload migration between device and network/cloud, one or more of the following may apply:

There may be no prior knowledge on the dynamic computing resource availability when the subject application is developed Device runtime/operating system (OS) may not have full visibility on available computing resources Network/cloud job scheduler may not have full visibility on device computing resources and workload To address the first issue, the dynamic workload migration may be designed as a platform capability that either provides application programming interfaces (APIs) for applications, or that is fully transparent to applications. To address the second and third issues, information exchange on computing resources/services between device and network may be supported.

Based on above considerations, embodiments herein may relate to at least one of the following two approaches that are designed to achieve dynamic device-network computing scaling.

In the first approach, the computing scaling may be done in the service level (e.g., compute as service). Network Compute Plane provides computing services to mobile devices. A Client Compute Service Function is introduced in the mobile device side to interact with the Comp CF and Comp SF in network for computing services. The Client Compute Service Function operates as part of OS or as a platform application running on top of OS.

Figure 6:
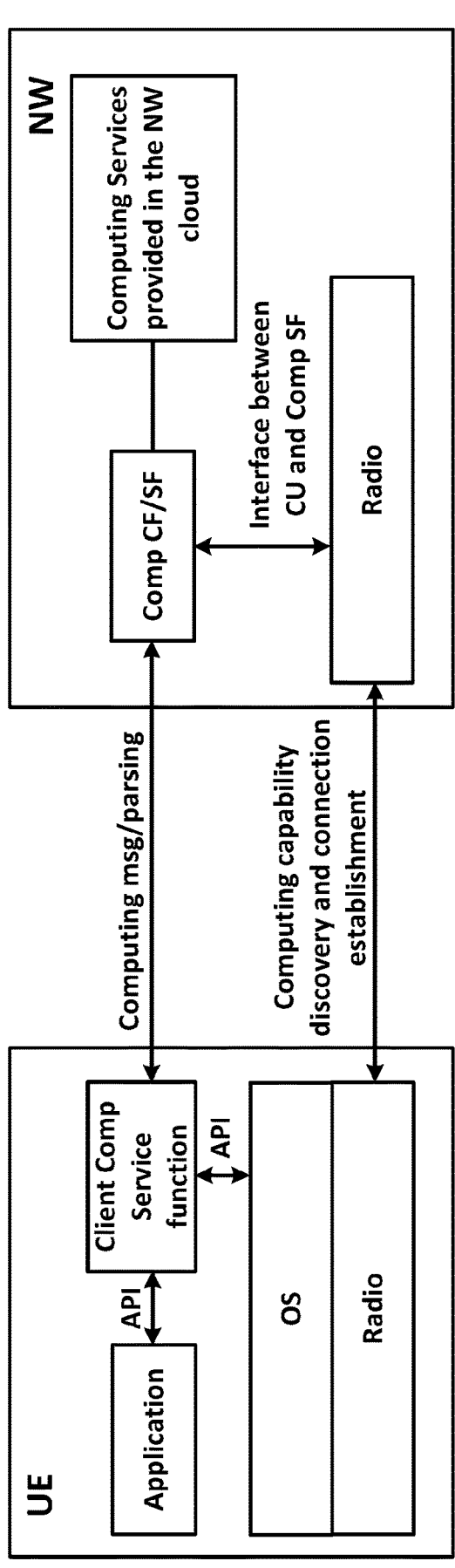
FIG. 6 illustrates an example "Computing as Service" approach for device-network (NW) computing scaling, in accordance with various embodiments.
Figure 7:
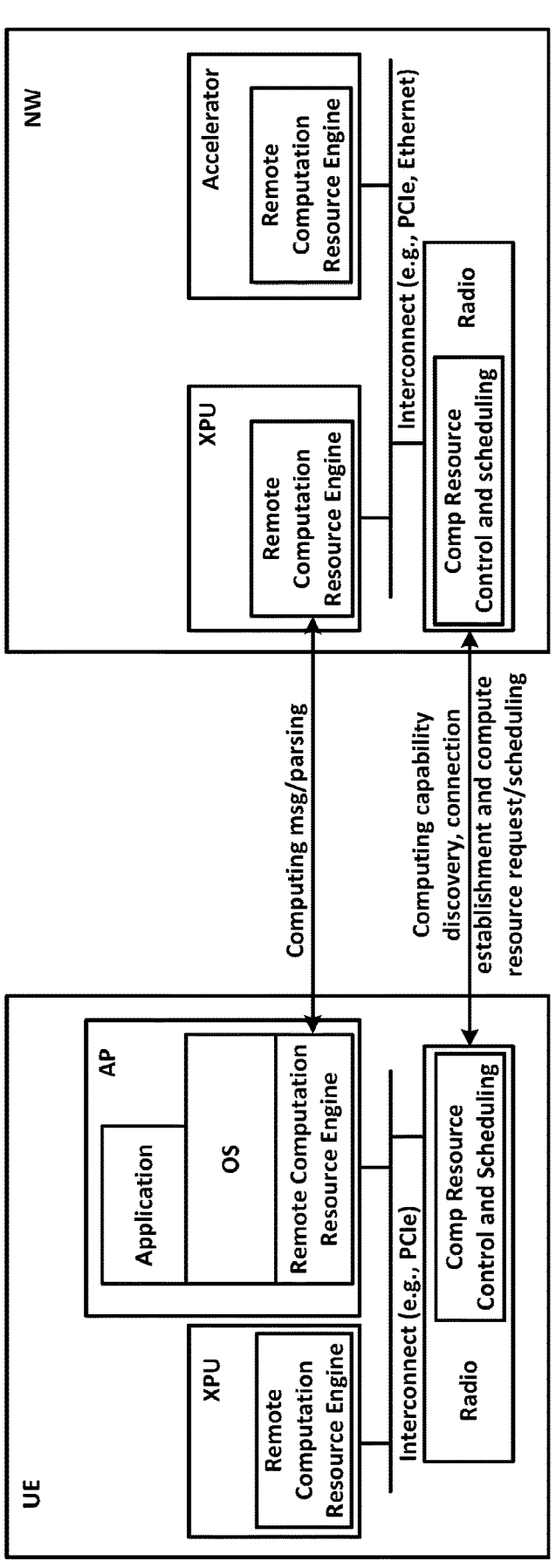
FIG. 7 illustrates an example "Computing as Resource" approach for device-NW computing scaling, in accordance with various embodiments.

In the second approach, computing scaling is done in the resource level at below OS (e.g., compute as resource). The air interface is responsible for finding and scheduling computing resources. A Compute Resource Control and Scheduling entity is introduced in the air interface for this purpose. Among the scheduled remote computing units (e.g., AP or XPU in the mobile device and XPU or accelerator in the network), a Remote Computing Resource Engine is implemented in each of the computing unit for these remote computing resources to exchange computing instructions and messages. FIG. 6 and FIG. 7 illustrate the functional blocks of "computing as service" approach and the "computing as resource" approach. Specifically, FIG. 6 illustrates an example "Computing as Service" approach for device-NW computing scaling, in accordance with various embodiments. FIG. 7 illustrates an example "Computing as Resource" approach for device-NW computing scaling, in accordance with various embodiments. It is noted that, in some embodiments, both of these approaches may co-exist in the system with each approach applicable for a different set of scenarios and requirements.

Figure 8:
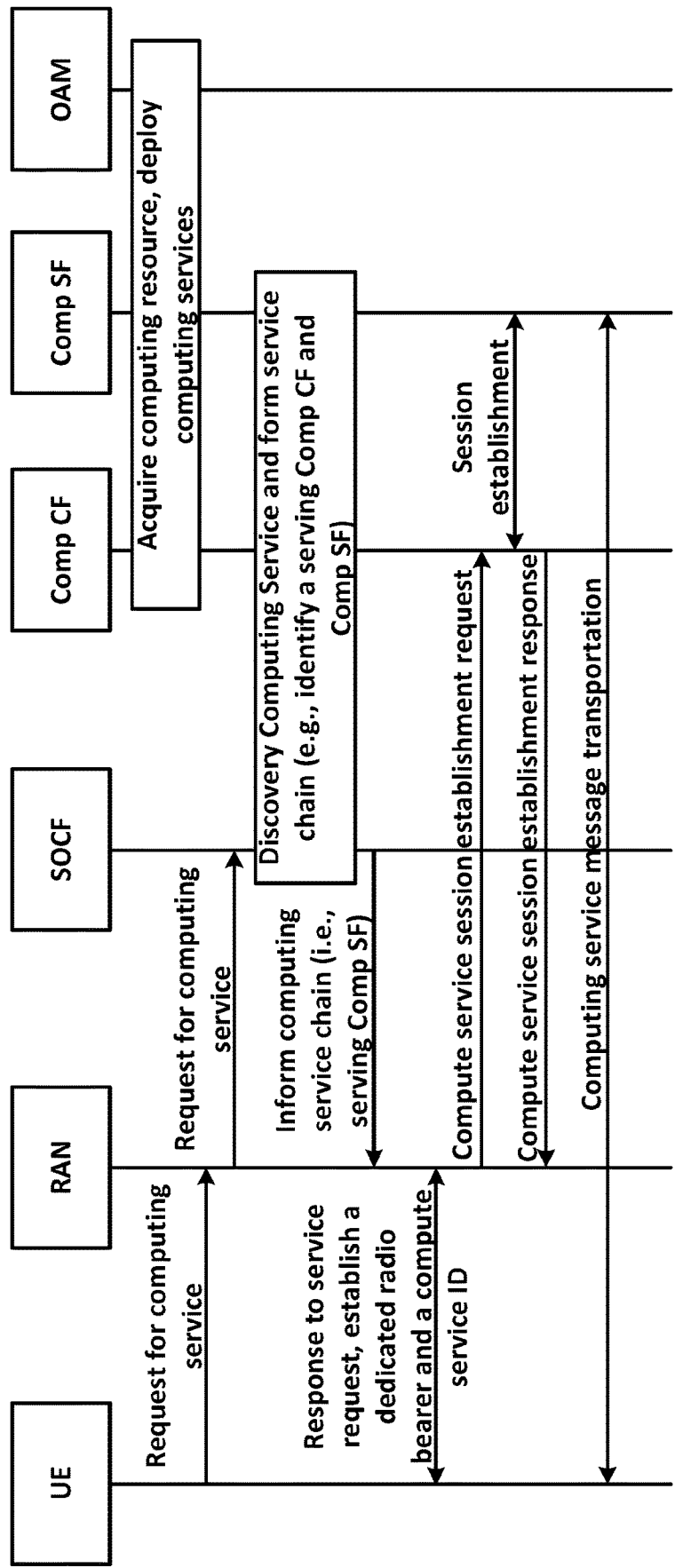
FIG. 8 illustrates an example procedure related to the "Compute as Service" approach for user equipment (UE)-NW computing scaling, in accordance with various embodiments.

FIG. 8 shows an example procedure of the "Compute as Service" approach for UE-NW computing scaling. Specifically, FIG. 8 illustrates an example procedure related to the "Compute as Service" approach for UE-NW computing scaling, in accordance with various embodiments.

It can be seen that, in the "Compute as Service" approach, the RAN may be responsible for forwarding UE's computing service requests to SOCF and establishing a proper connection between the mobile device and the assigned Comp SF (e.g., establish a dedicated radio bearer between UE and RAN and a transport link between RAN and Comp SF). The compute service discovery and the service endpoint selection may be initiated by the SOCF, e.g., SOCF looks for the compute services and select a serving Comp CF which then selects a serving Comp SF. With the selected serving Comp SF and the established communication link between UE and the Comp SF, messages between the Client Computation Service Function (CCSF) and the Comp SF can then be transported. The CCSF serves as a UE platform runtime that schedules local service executions and remote service executions. The CCSF interacts with local OS and the Comp SF to get information on computing services and capabilities in the UE and in the network respectively. During application execution, applications submit service requests to the CCSF. The CCSF may then decide in real time whether a service request can be fulfilled in the UE or need to be fulfilled in the network. If a service request needs to be fulfilled in the network, the CCSF translates the service request into a remote service request call and send to Comp SF for processing.

Figure 9:
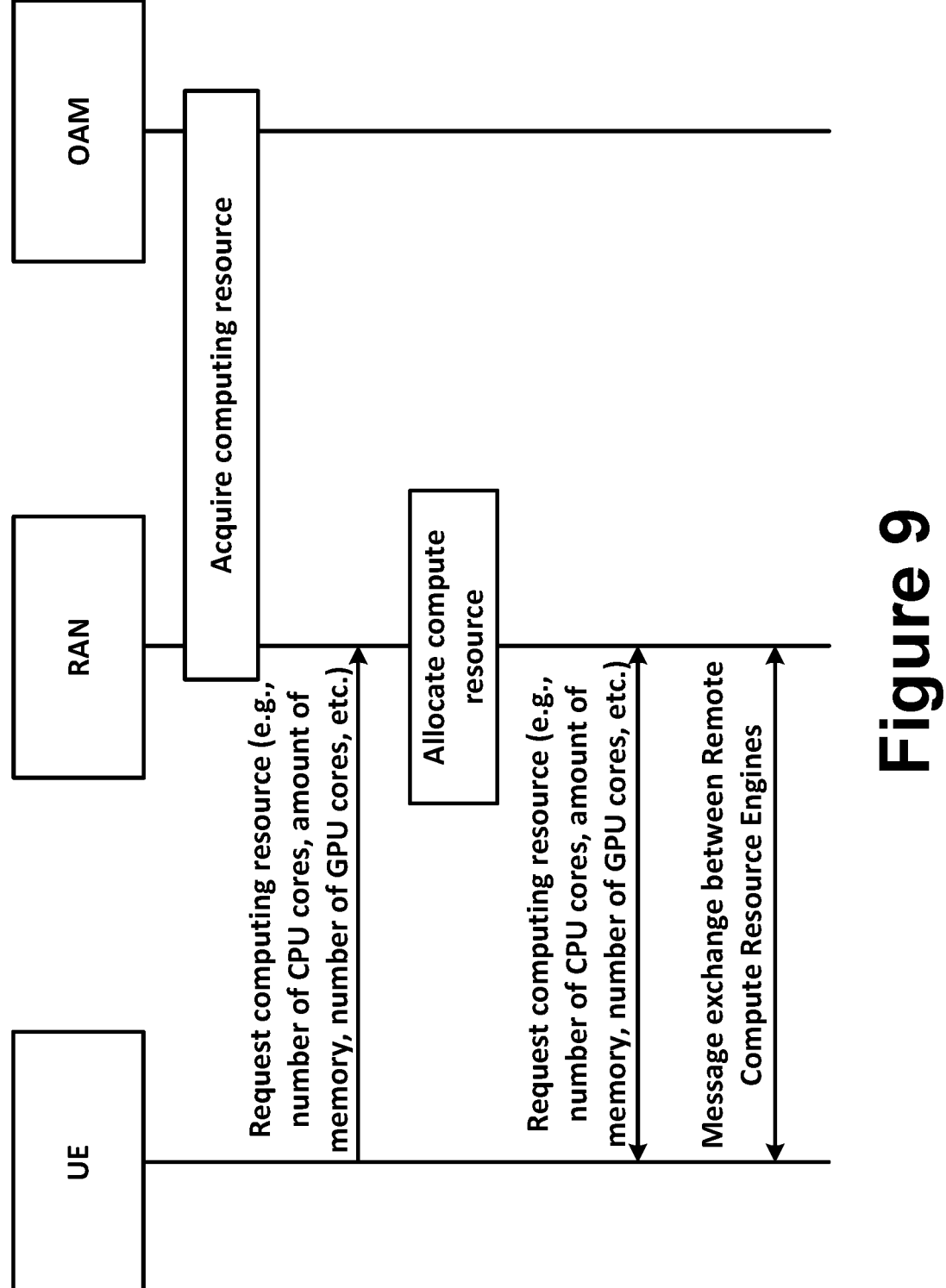
FIG. 9 illustrates an example procedure related to the "Compute as Resource" approach for UE-NW computing scaling, in accordance with various embodiments.

FIG. 9 shows an example procedure of the "Compute as Resource" approach for UE-NW computing scaling. Specifically, FIG. 9 illustrates an example procedure related to the "Compute as Resource" approach for UE-NW computing scaling, in accordance with various embodiments.

In this approach, UE's computing resource requests terminate at RAN. RAN is responsible for interpreting computing resource requests, acquiring and allocating computing resources for UEs as well as establishing a radio bearer for transporting messages between the Remote Compute Resource Engine at the UE and the Remote Compute Resource Engines at allocated computing devices in the network.

Capability #3: RDMA Over Radio

One example of UE-NW computing scaling is to enable remote direct memory access (RDMA) between UE and NW. RDMA may allow for direct data placement in the application memory buffer of a remote computing devices. It may further allow bypassing the operating system and eliminating the overhead of data copying between kernel space memory buffer and user space memory buffer, the overhead of user/kernel context switch and the overhead of interruptions. CPU cycles may also be freed up to handle other tasks. For UE-NW computing scaling, it may therefore be worthwhile to exploit the potential of enabling RDMA over Radio to enable direct memory access between UE and computing devices in the network.

Figure 10:
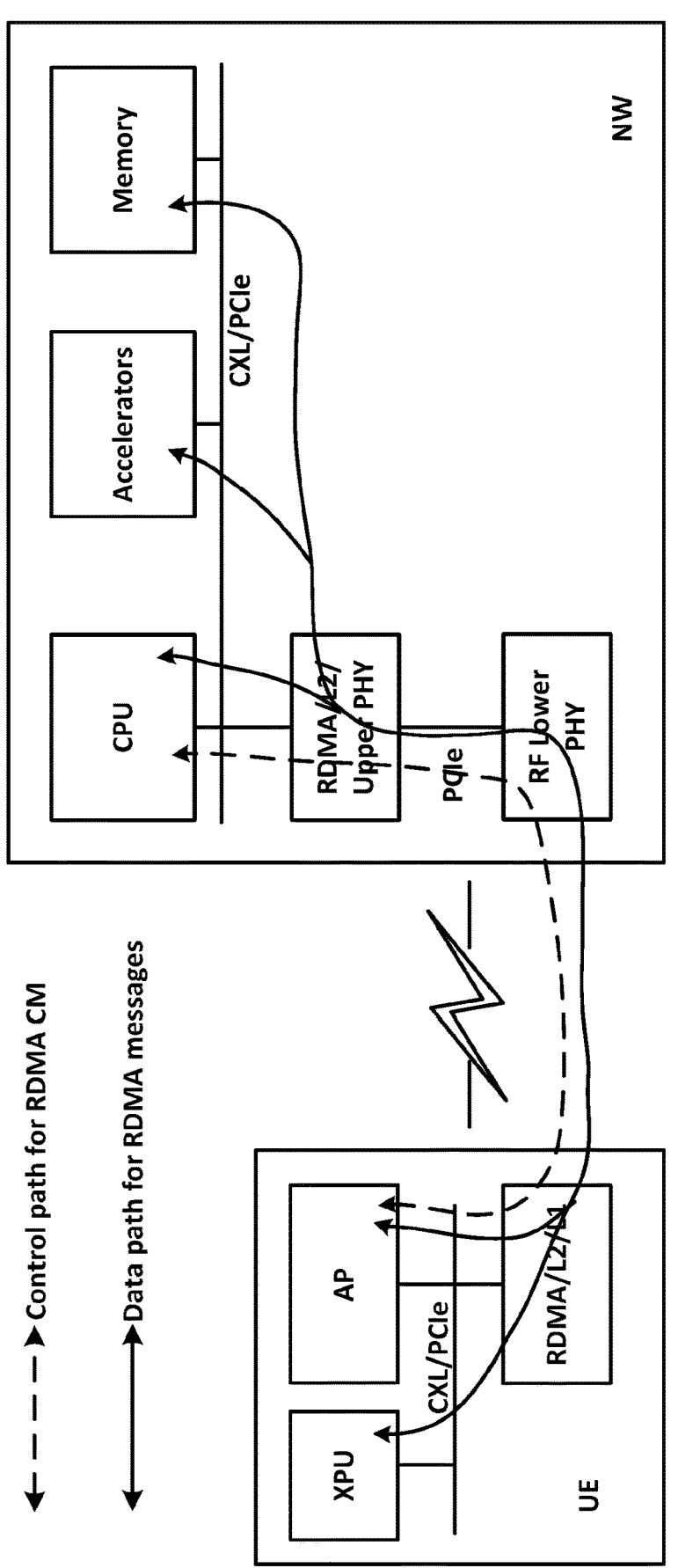
FIG. 10 illustrates an example remote direct memory access (RDMA) over Radio Scenario, in accordance with various embodiments.
Figure 11:
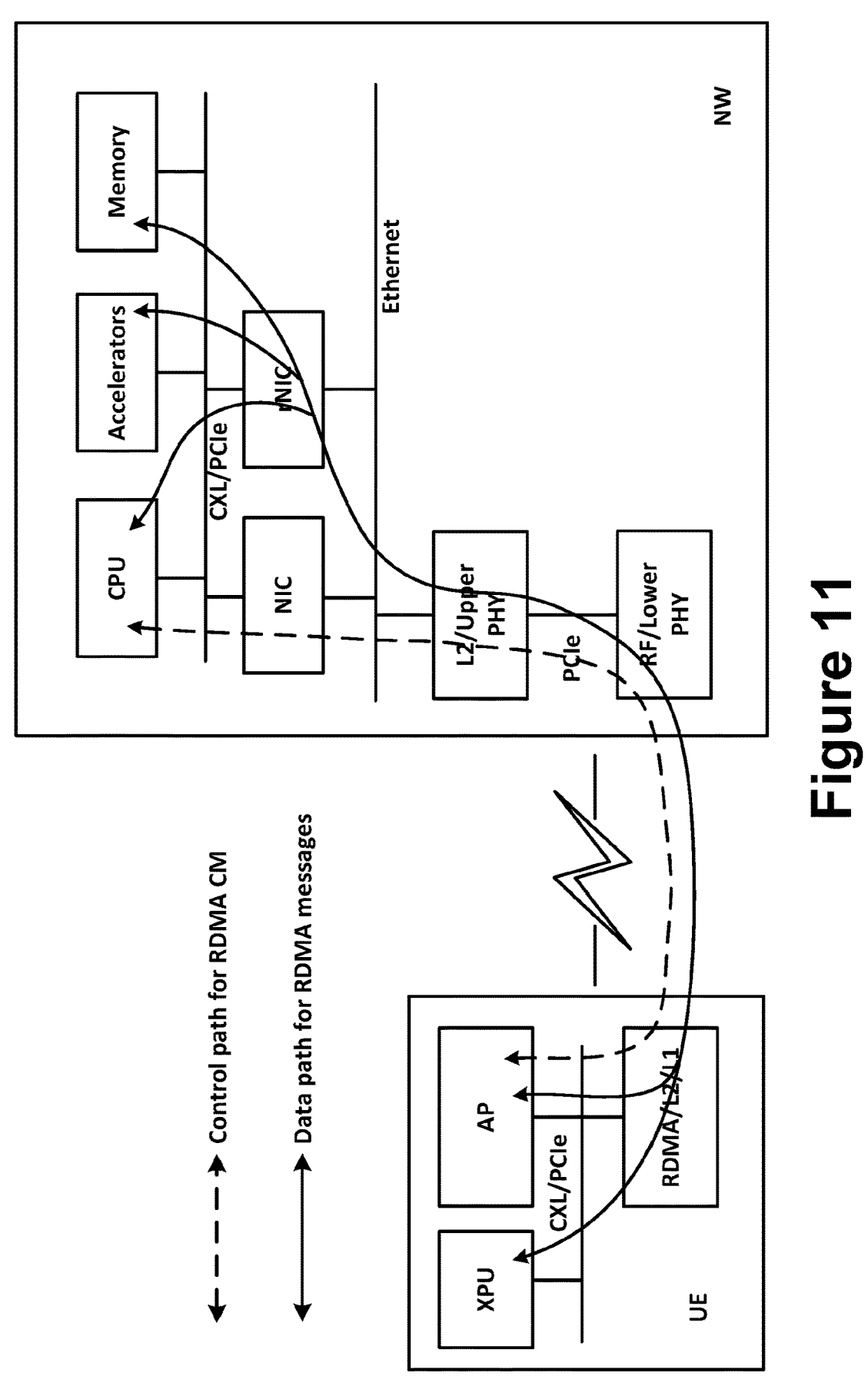
FIG. 11 illustrates an alternative example RDMA over Radio Scenario, in accordance with various embodiments.

FIG. 10 and FIG. 11 illustrate two scenarios for RDMA over Radio. Specifically, FIG. 10 illustrates an example remote direct memory access (RDMA) over Radio Scenario, in accordance with various embodiments. FIG. 11 illustrates an alternative example RDMA over Radio Scenario, in accordance with various embodiments.

In the first scenario (e.g., FIG. 10), RDMA queue pairs (QP) are established between computing devices in UE (e.g., application processor, other processing units, etc.) and network computing devices that connect to RAN units via peripheral component interconnect express (PCIe). In some embodiments, additional protocols such as compute express link (CXL) may run ton top of these connections. The RAN services as the network I/O device for the computing devices in the network. In the second scenario (e.g., FIG. 11), RDMA queue pairs are established between computing devices in UE (e.g., application processor, other processing units, etc.) and network computing devices that connect to RAN units via Ethernet. The RAN routes packets to the rNIC that services as the network I/O device for the computing devices. For both scenarios, the computing device allocation can follow schemes as described in Capability #2 (e.g., the Dynamic device-network computing scaling described above).

To enable RDMA over Radio, it may be desirable to map RDMA protocol fields into radio layer protocol fields. More specifically, one or more of the following may be addressed or involved:

1) QP establishment. The RDMA connection manager (CM) may rely on out-of-band signal for QP establishment. For RDMA over radio, an out-of-band signal over the radio may be defined to support RDMA QP establishment.

2) Flow control and rate adaptation. As RDMA is fully implemented in the network interface controller (NIC) (e.g., radio modem, RDMA-enabled NIC (rNIC)), minimizing the memory footprint may be a design consideration. The radio link layer may therefore closely manage radio transmission data rate to match the RDMA layer processing speed and minimize out-of-order packet delivery.

3) RDMA message transportation. RDMA messages include RDMA control messages and data transfer messages. The radio link may define proper radio bearer to carry these RDMA messages.

For the first element, QP establishment, the RDMA CM messages for QP establishment can be carried via radio CP signaling between UE and network. The radio interface module can then map the RDMA CM message to proper control signal transport path towards the computing host device where the RDMA CM locates. For Scenario 1 in FIG. 10, the control signal transport part between the radio interface module and the computing host device is via PCIe in both UE side and network side. For Scenario 2 in FIG. 11, the control signal transport part between the radio interface module and the computing host device is via PCIe and Ethernet in the network side. Note that the RDMA CM endpoint can be in a host CPU (as showed in these figures) or offload to the radio modem.

For the second and the third elements (e.g., flow control and rate adaption, and RDMA message transportation), the RDMA message transportation can be via UP radio bearers. The MAC layer can be made aware on logical channels that carry RDMA message transport and perform flow control and rate adaption accordingly. The RDMA control protocol, which handles traffic monitoring, rate adaption, congestion control, etc. in the RDMA layer can be enhanced to achieve end-to-end flow control. This enhancement may be desirable, for example, when transport network for RDMA messages has multiple hops as the case of Scenario 2 in FIG. 11.

Figure 12A:
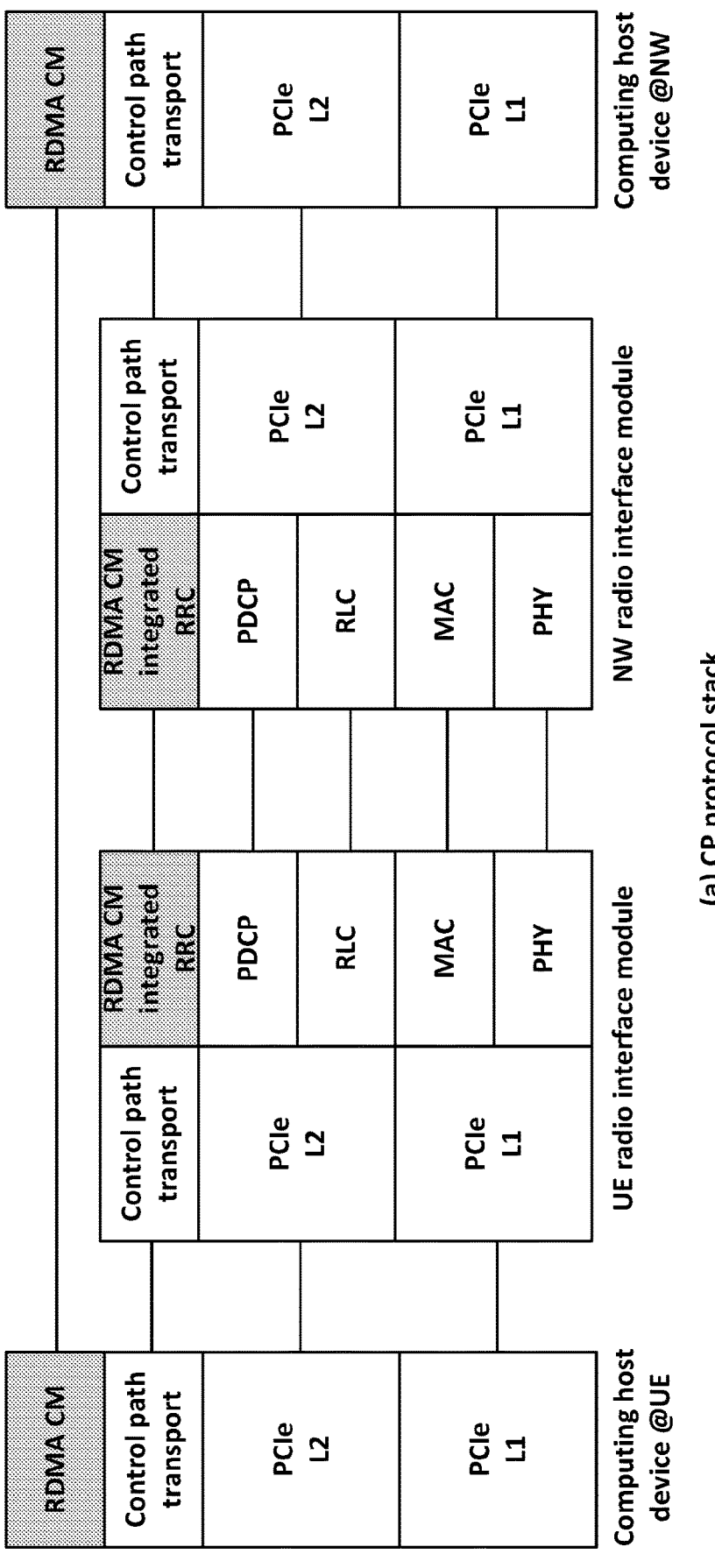
FIGS. 12A and 12B illustrate an example user plane (UP) and control plane (CP) protocol stack for the example RDMA over Radio Scenario of FIG. 10, in accordance with various embodiments.
Figure 12B:
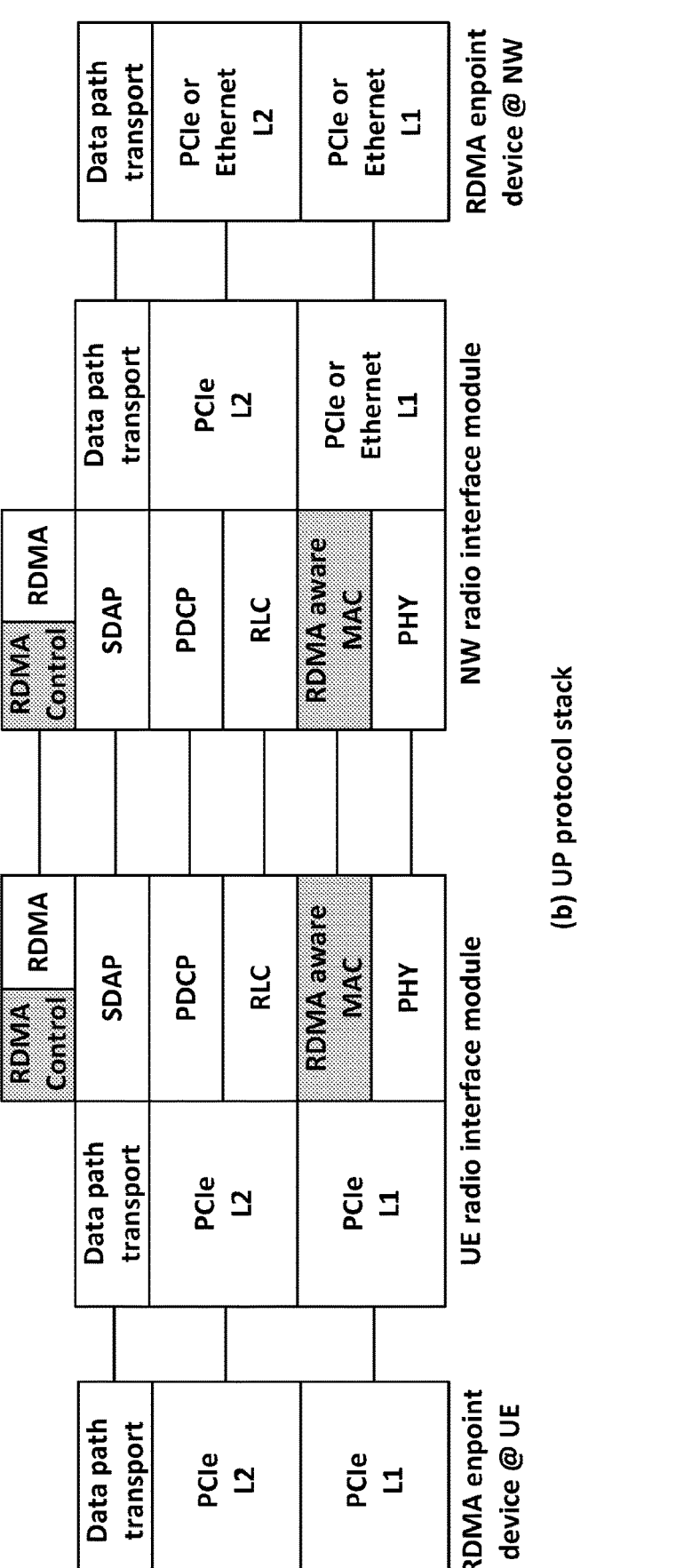
Figure 13A:
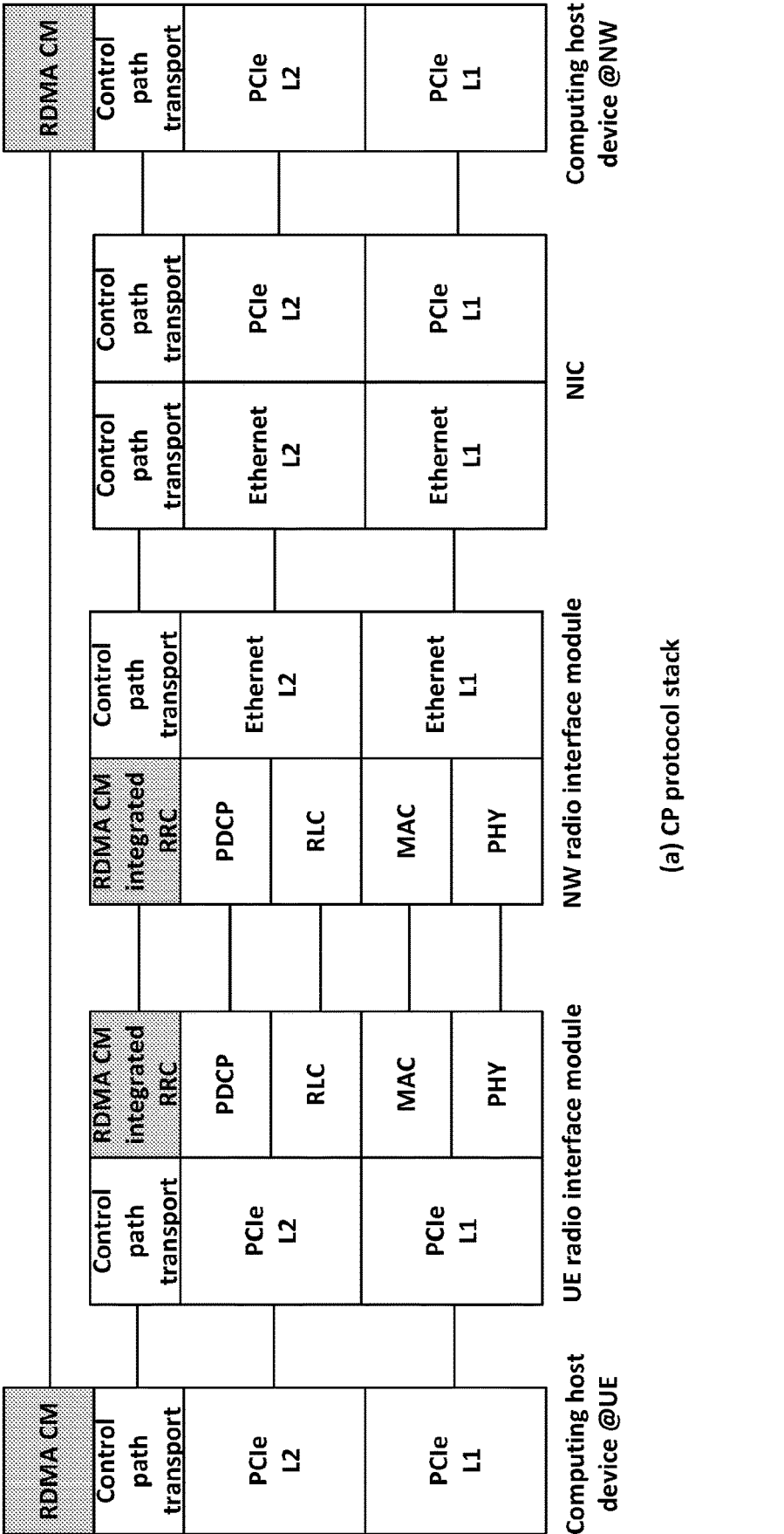
FIGS. 13A and 13B illustrate an example UP and CP protocol stack for the example RDMA over Radio Scenario of FIG. 11, in accordance with various embodiments.
Figure 13B:
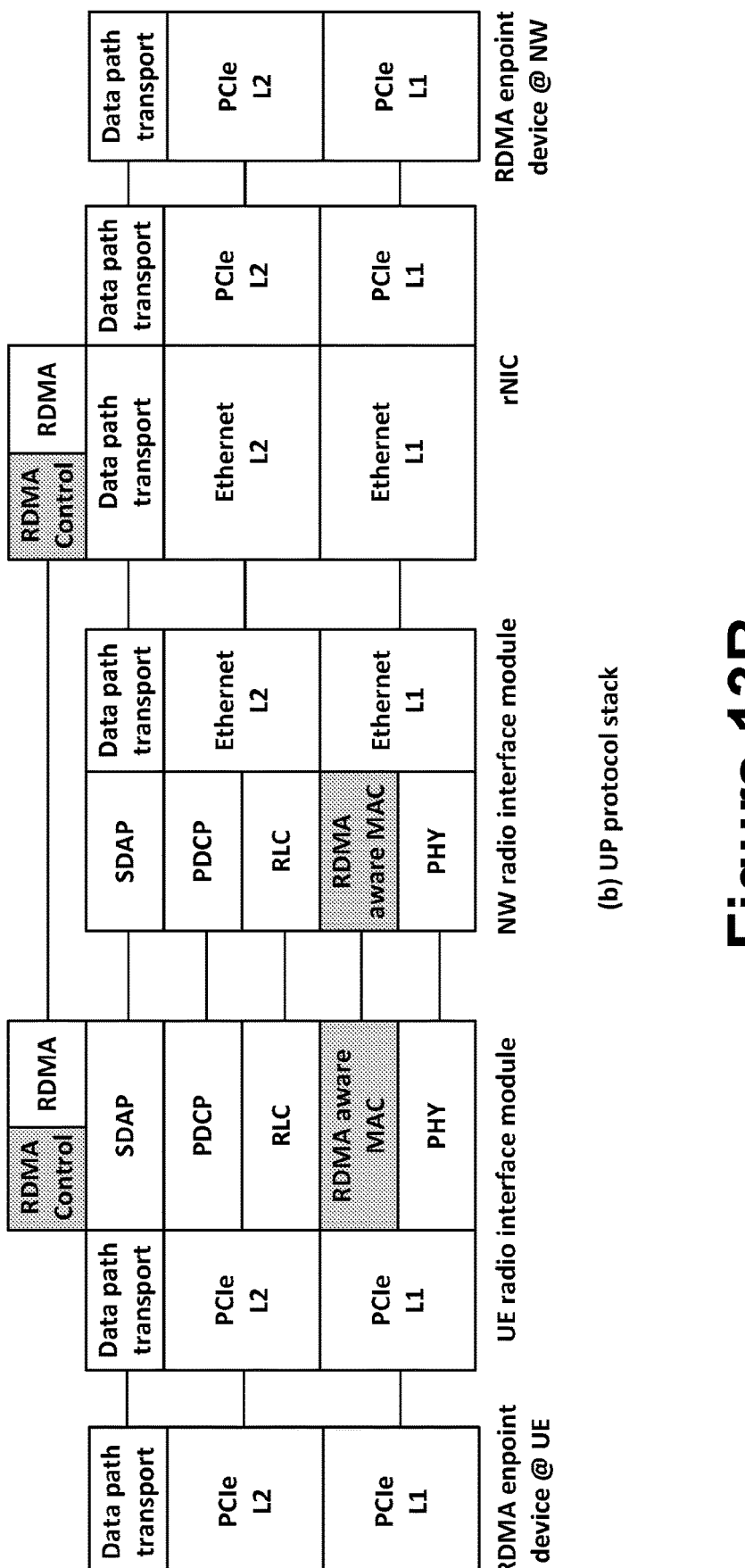

FIG. 12 and FIG. 13 illustrates the CP and UP protocol stacks for Scenario 1 and Scenario 2, respectively. The main difference between the scenarios of FIG. 12 and FIG. 13 is that in the network side, the transport path of Scenario 2 has an additional hop of network transport. The interfaces between the air interface module and the compute host device/RDMA endpoint device may, in some embodiments, be based on proprietary implementation.

Capability #4: Cloud Workload Offloading to Network

Figure 14:
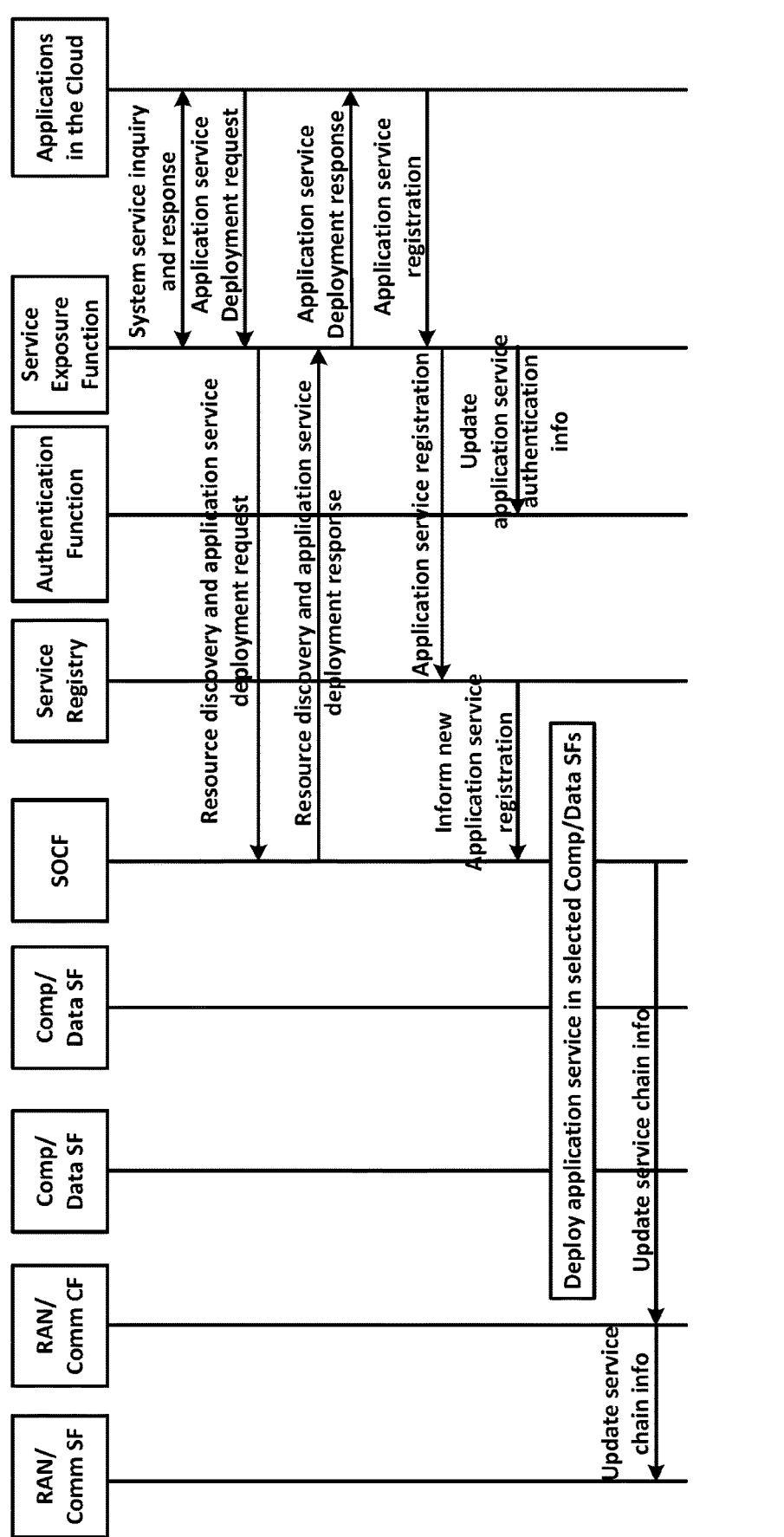
FIG. 14 illustrates an example procedure for cloud workload offloading and data preprocessing.

Besides offloading UE computing to network elements, the cloud can also offload computing to one or more network elements (e.g., elements of the 5GS or 5GC) to meet service requirements. Also, implementations related to large amounts of data and concerns on data privacy, some preprocessing can be done in the network before sending data to the network. FIG. 14 shows an example procedure for cloud application workload offloading and data preprocessing. In the example procedure, cloud applications interact with the 6G system's Service Exposure Function (SEF) to inquire about system services and request for services. The SEF may act as a bridge between the 6G system and external systems. If the 6G system can provide the requested cloud application workload offloading or data preprocessing service, the requested application service may be registered in the Service Registry and informed to the SOCF. The corresponding authentication and policy setting may be recorded in the Authentication Function. The SOCF can then select proper Comp SF/Data SF, deploy the application service instances, and send the updated service chain info to RAN CP and Comp SF, which then update RAN UP and Comp SF a related routing path according to the updated service chain. The subsequent downlink or uplink traffics associated with the application can then follow the process pipeline in the updated service chain.

Capability #5: Computing-Embedded Air Interface

From discussions in previous subsections, it may be noted that one or more of the following features may be enabled in the air interface to support computing/data services and resources:

Signaling for computing/data service and resource discovery. Information on computing/data services and resources that the 6G system provides can be incorporated in the system information signaling in the air interface. The system information can be broadcasted to UEs or provided on demand.

Signaling for compute/data service establishment. In the service establishment stage, UE's service compute/data initial service requests may be carried in the CP signaling over the air interface. The RAN may receive the CP signaling and route the service request messages to proper endpoints. When the service request is for computing/data resources, the message is terminated at the RAN. The RAN will schedule computing/data resources in response to the request as illustrated in FIG. 9. When the service request is for computing/data services, the request message is forwarded to the SOCF for service discovery, orchestration, and chaining.

Establishment of radio bearers for transport compute/data message exchanges between UE and service endpoints. As the 6G system provides three service planes (e.g., Compute Plane, Data Plane, Communication Plane), UP data for the three service planes may have different termination points and communication QoS requirements, e.g., UP data for Compute Plane services may terminate at Comp SF, UP data for Data Plane services may terminate at Data SF, UP data for Communication Plane services may terminate at the cloud. In order for the RAN to steer UP data towards different service end points and provide required radio transmission QoS, proper radio bearers need to be established. When UP traffics towards different service endpoints can be multiplexed onto a same radio bearer, a service identifier can be introduced to identify the different service UP traffic flows.

Compute-aware resource scheduling. In the "Compute as Service" approach for UE-network computing, the RAN holds both radio resource and computing resource. The radio resource scheduling and the computing resource scheduling can therefore leverage information from each other when scheduling radio and computing resources. For instance, knowing a computing task is scheduled to complete execution at a time slot, the radio scheduler can pre-schedule radio resource at the time slot for transmission of the execution results. To achieve this feature, explicit or implicit information sharing between computing resource scheduler and radio resource scheduler is needed. In RDMA over radio, the MAC can be made aware on the logical channels carrying RDMA messages so that it can perform rate adaptation accordingly.

Capability #6: Service Chain Aware Transport

In 5G and previous generations, the mobile network may serve as a data pipe and provide transport tunnels (e.g., GTP-U tunnels) for IP and non-IP traffics between mobile devices and application servers in the cloud. This scheme may be sufficient for legacy cloud computing because computing and user data processing/storage may reside in the cloud (edge cloud or center cloud) beyond mobile core network (e.g., beyond UPF in 5G core network, and beyond P-GW in 4G core network). In 6G, with computing and data further extend to network edge, the legacy transport approach may be insufficiently flexible to support widely distributed computing endpoints. As a result, it may be desirable to implement a transport approach that can be aware on the service chain of each packet and deliver each packet to computing plane or data plane functions in the service chains.

Figure 15:
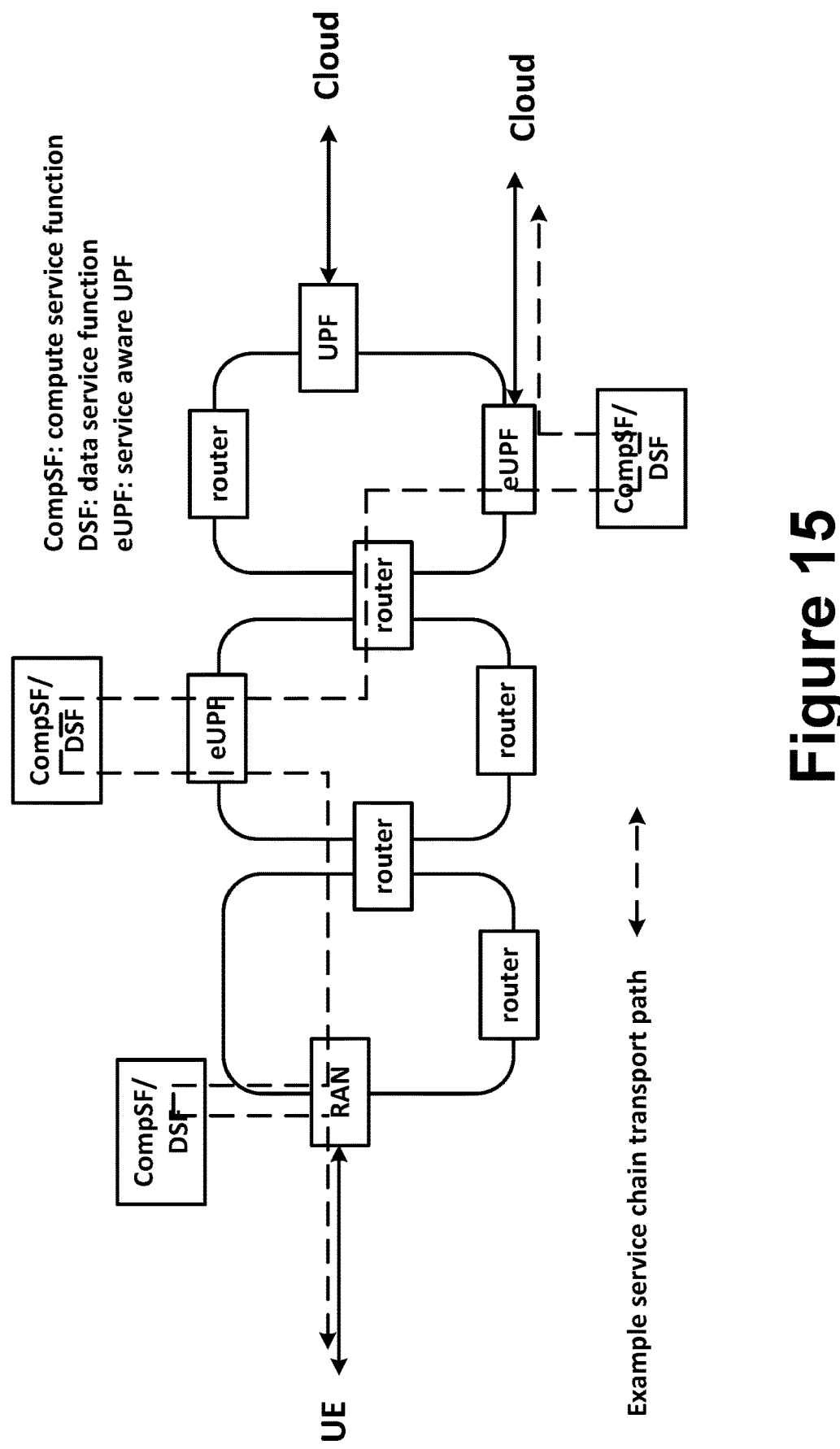
FIG. 15 illustrates an example of a service chain aware transport, in accordance with various embodiments.

FIG. 15 illustrates an example of the service chain aware transport. In the example, user data transported between UE and the cloud goes through several intermediate processing stages (e.g., data compression/quantization/filtering, model training as part of federated learning, etc.) hosted by Computing Plane and Data Plane service functions in the network. The service chain may be configured by SOCF following similar procedures as described in Capabilities #1, #2, and #4, above. To achieve service chain aware transport, one or more of the following two schemes may be considered:

Scheme 1: MultiProtocol Label Switching (MPLS)-type scheme. In this scheme, each data flow may be identified by a flow ID (or a label). The SOCF may chain up the transportation path as well as computation and data services along the path. The Comm SFs, Comp SFs and Data SFs in the transportation and service path are configured accordingly by their respective Comm CF, Comp CF and Data CF. For each data flow, each Comm SF in the transportation path forwards packets of the data flow to configured Comp CF, Data CF or Comm SF following the service chain.

Scheme 2: Segment routing-based scheme. In this scheme, each packet may carry a set of labels that identifies the service chain for the packet. The labels may be created based on the service chain configuration (as configured by SOCF) and inserted to each packet at the entrance point of a service segment. In the case that the mobile network transport is a single service segment, the entrance points are the RAN UP function and the Comm SF interfacing with the cloud. In the case that multiple service segments are defined in the mobile network transport, the entrance points may be the Communication Plane UP functions at the two ends of a service segment. To generate those service labels, service segment entrance points may receive service chain configurations from SOCF and generate labels for packets accordingly. Upon receiving a packet, a Comm SF may read the first label of the packet, remove this first label from the packet (optionally), and forward the packet to corresponding Comm SF or Data SF or Comm SF as identified by the service label.

As noted, Scheme 1 may be related to the concept of MPLS. It may only provide per-flow based services aware transport. When there is a reconfiguration on service chain, all Communication Plane UP functions (e.g., RAN UP functions and Comm SFs) along the transport path may need to be reconfigured. Scheme 2 may be related to the concept of segment routing. It may provide per-packet based service aware transport as well as per-flow based service aware transport. When there is service chain reconfiguration, only service segment entrance points need to be updated.

Note that service chain aware transport may co-exist with conventional GTP-u tunneling based transport. The RAN UP function and the comm SF at two ends of the mobile network transport can be configured to do the selection between the service chain aware transport path and the GTP-u tunnel path and steer incoming traffics to the selected path.

Capability #7: Enabling AI Capabilities

Building on the Control Plane and Data Plane capabilities of the 6G system, two types of AI/ML-related services may be enabled:

AI/ML for communication. This service may provide AI/ML services to Communication Plane functions. Examples include AI/ML-assisted network operation and automation, AI-assisted air interface.

Communication for AI/ML. This service may use Communication Plane functions to help address AI/ML computing and data related problems, such as distribute AI learning/inference workload among UEs and network, enable privacy-preserving in-network data pre-processing, etc.

Figure 16:
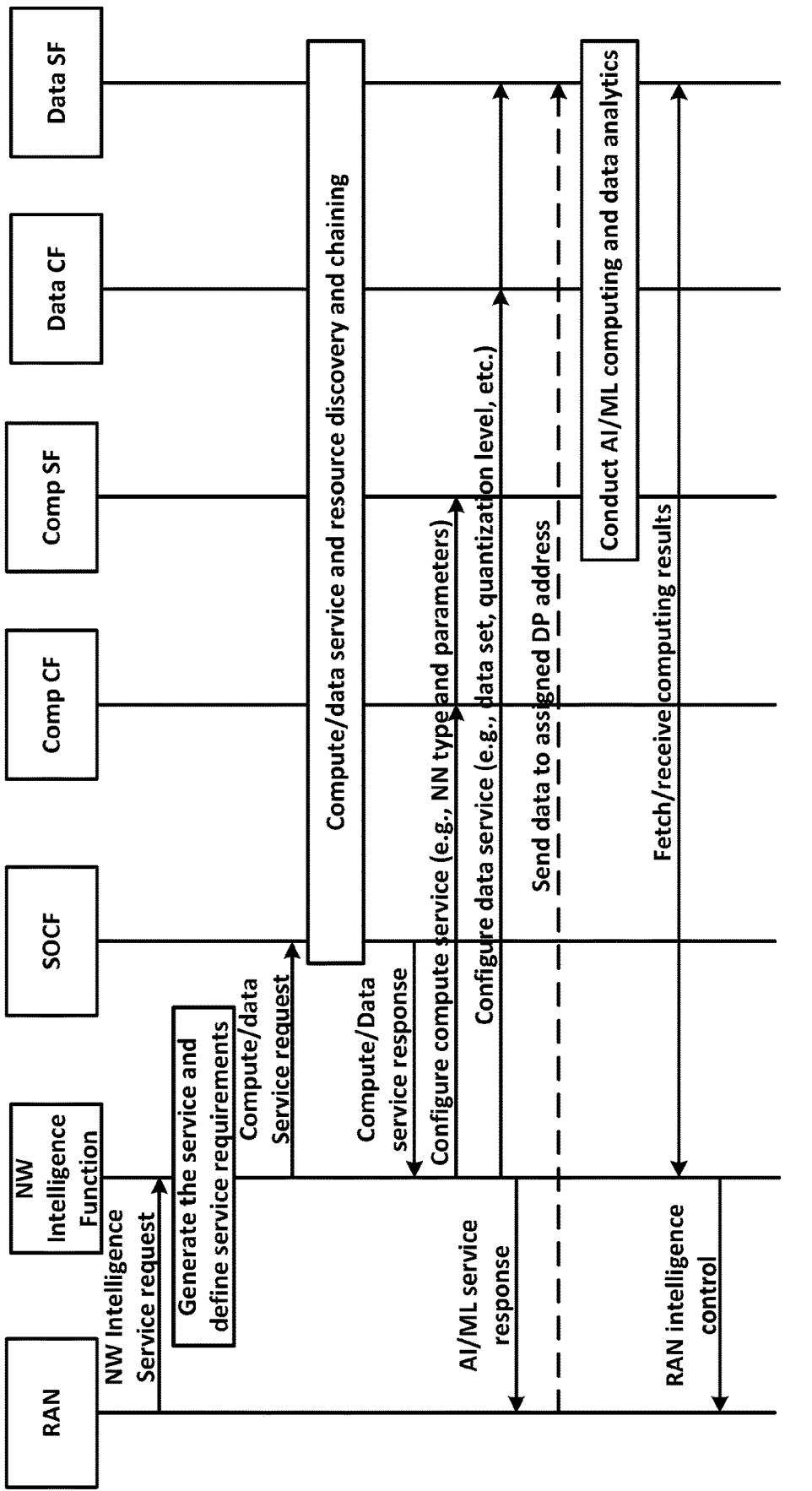
FIG. 16 illustrates an example procedure to enable artificial intelligence/machine-learning (AI/ML)-assisted radio access network (RAN) operation, in accordance with various embodiments.

As AI/ML workloads fundamentally is a type of computing and data workload, these two types of AI/ML services can be achieved using Computing Plane and Data Plane features described in the previous sections. FIG. 16 shows an example procedure for AI/ML-assisted RAN operation. In the example, RAN initiates a network intelligence service request to a Network Intelligence Function. The service request can contain information on the type of intelligence service (e.g., cell coverage optimization, frequency resource allocation optimization, etc.). Upon receiving the service request, the Network Intelligence Function may generate the service expression which includes the required training/ inference algorithm, required computing resource, required data set and pre-processing, required training/inference accuracy and response time, etc. The Network Intelligence Function may send the service expression to the SOCF which may then find proper Computing Plane and Data Plane services and resources to meet the requirements as defined in the service expression and generate the processing chain. Once it has been informed on the computing/data service chain, the Network Intelligence Function can direct interact with the assigned Comp SF and Data SF for configuration setting and update. The service chain information may also be provided to the RAN so that RAN will directly send data for training and inference to Data SF(s) in the service chain. The training and inference results can be stored in memory locations assigned by Data SF. Network Intelligence Function can be notified when training and interference results are available and pull results as needed.

Note that the example procedure may apply to scenarios where the network intelligence service for RAN is non-persistent, e.g., the RAN needs the intelligence service in a short time period. When the network intelligence service is persistent and long lasting, the handling on computing and data resources for the network intelligence service would be done by the Management Plane.

Figure 17:
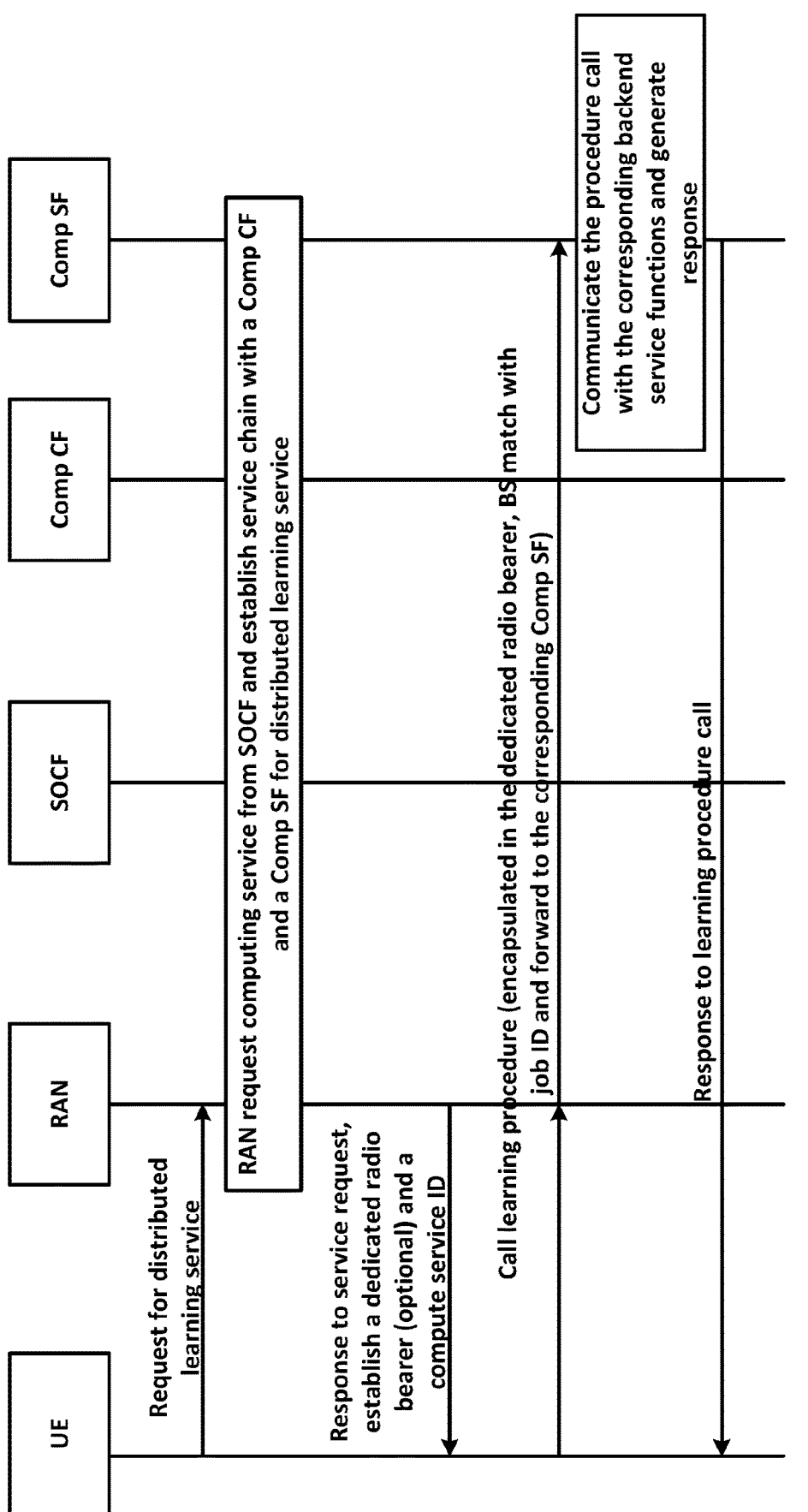
FIG. 17 illustrates an example procedure for distributed machine learning between UE and network, in accordance with various embodiments.

FIG. 17 shows an example procedure for distributed machine learning between UE and network. The example procedure essentially follows the same procedure as the "compute as service" UE-NW computing scaling approach in Capability #2. In the example, the machine learning workload is distributed between UE and network. Network provides learning services to offload UE's machine leaning workload.

Example Techniques

FIG. 18 illustrates an example technique, in accordance with various embodiments herein. Specifically, the technique of FIG. 18 may be a technique to be performed by an electronic device that is to implement a logical entity of a core network (CN) of a cellular network. The logical entity may be configured to identify, at 1805 from a base station of the cellular network, a service request related to a service of the cellular network that is to be provided to a service subscriber of the cellular network; identify, at 1810, an indication of the service in a cloud service registry function of the network; identify, at 1815 based on the indication of the service, service endpoints related to the service; and provide, at 1820 to the base station, an indication of the service endpoints.

FIG. 19 illustrates an alternative example technique, in accordance with various embodiments herein. The technique of FIG. 19 may be a technique to be performed by a base station of a cellular network. The base station may be configured to identify, at 1905 from a user equipment (UE) of the 6G cellular network, a request for one or more network-based compute resources; identify, at 1910 based on the request, one or more network-based compute resources; and provide, at 1915 to the UE, an indication of the one or more network-based compute resources.

FIG. 20 illustrates an alternative example technique, in accordance with various embodiments herein. The technique of FIG. 20 may be a technique to be performed by a user equipment (UE) of a cellular network. The UE may be configured to establish, at 2005 with a base station of the cellular network, a remote direct memory access (RDMA) connection; and transmit, at 2010, one or more RDMA messages to the base station.

FIG. 21 illustrates an alternative example technique, in accordance with various embodiments herein. The technique may relate to a technique to be performed by an electronic device that is to implement a user plane (UP) network function. The UP network function may be configured to identify, at 2105, a flow identity or packet label of a UP packet; and process, at 2110, the UP packet based on the flow identity or packet label.

Systems and Implementations

Figure 22:
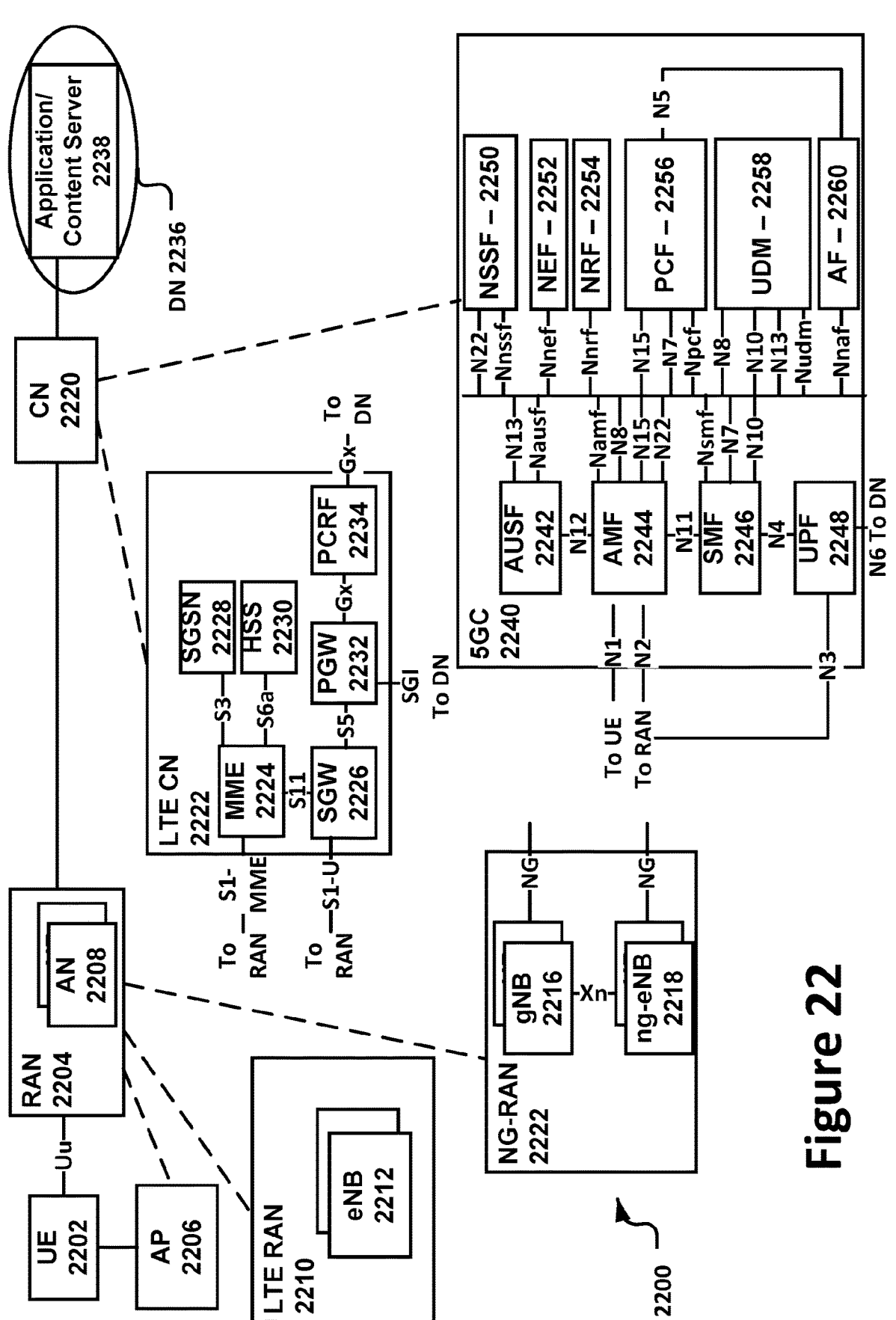
FIG. 22 schematically illustrates a wireless network in accordance with various embodiments.
Figure 23:
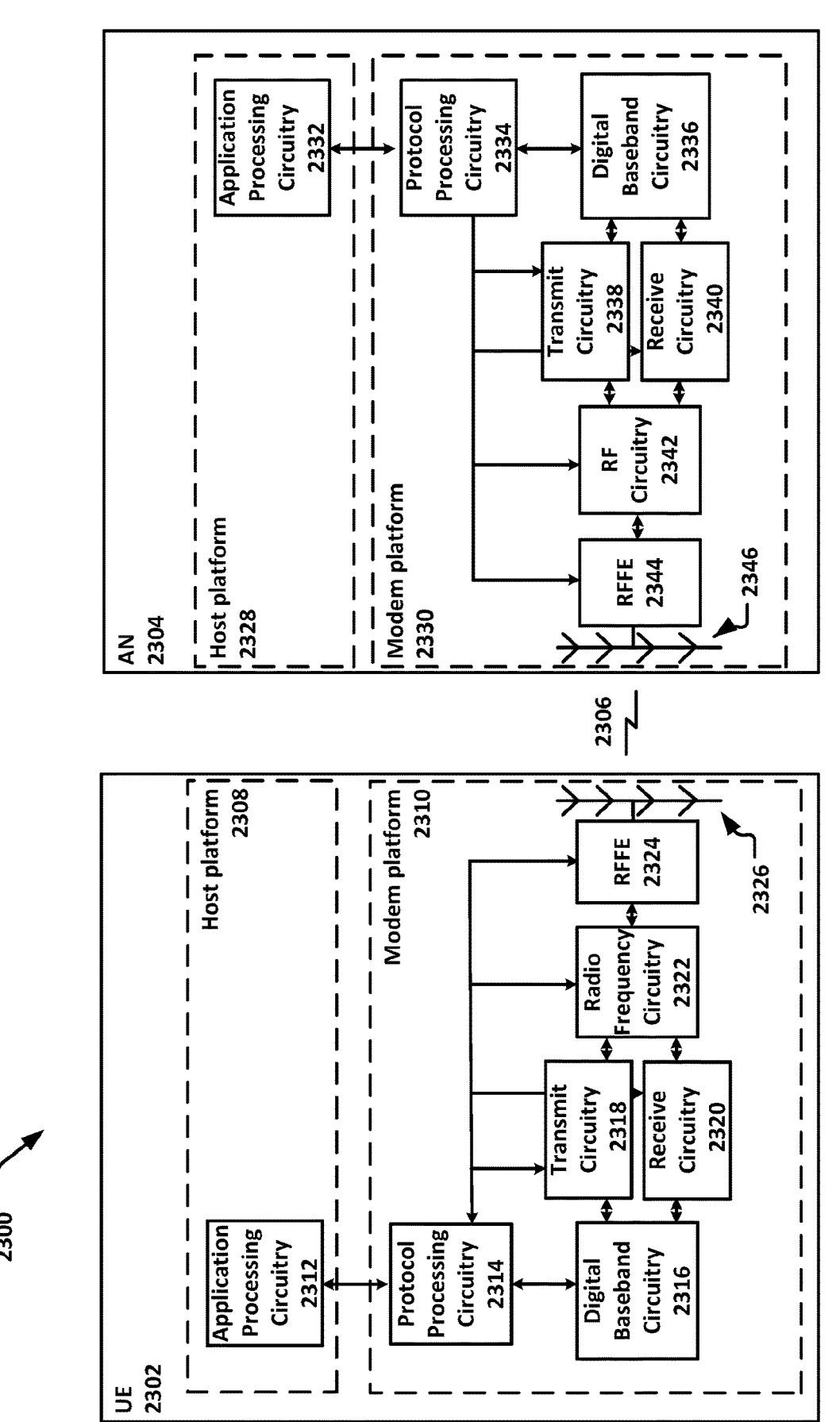
FIG. 23 schematically illustrates components of a wireless network in accordance with various embodiments.
Figure 24:
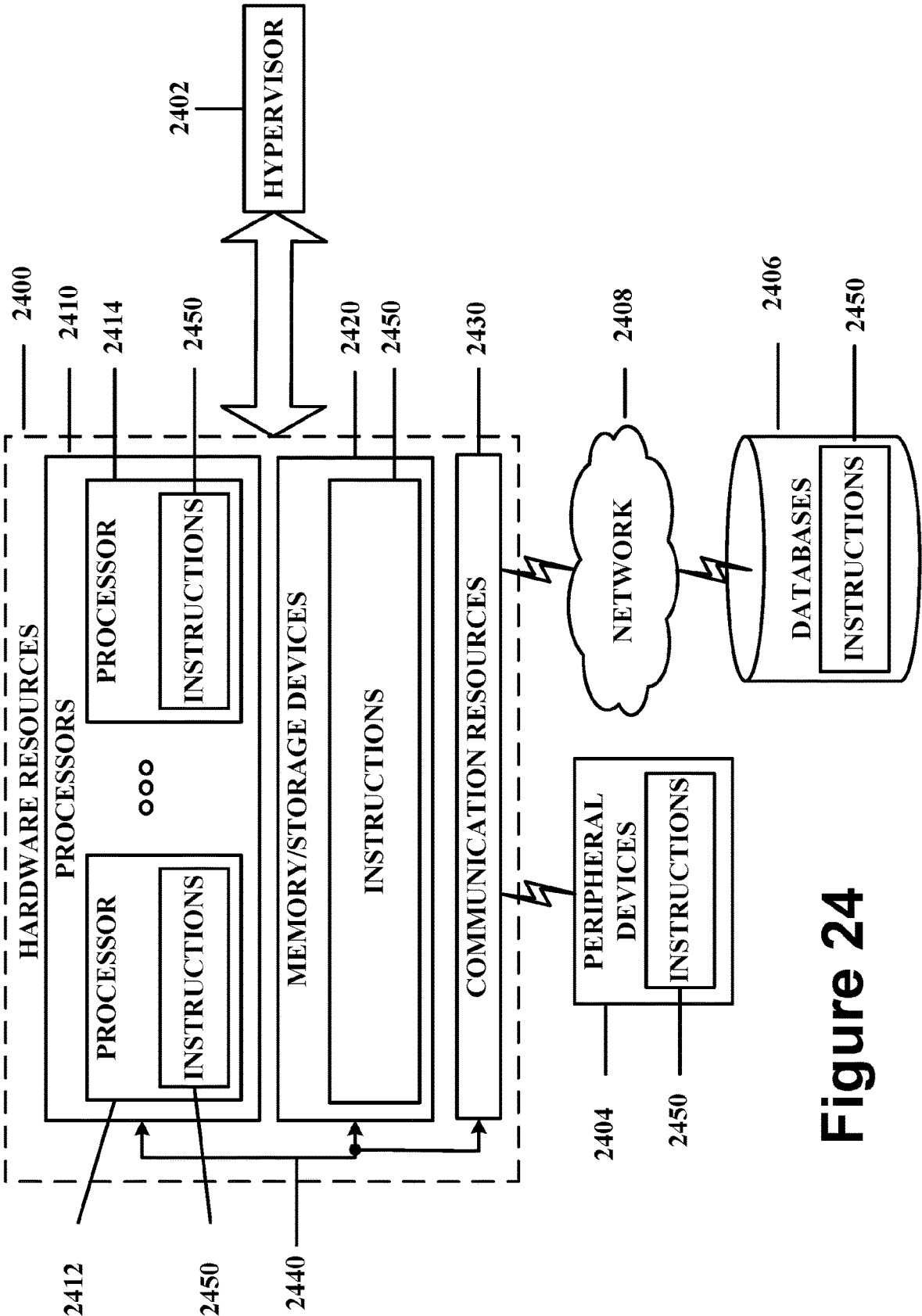
FIG. 24 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 22-24 illustrate various systems, devices, and components that may implement aspects of disclosed embodiments.

FIG. 22 illustrates a network 2200 in accordance with various embodiments. The network 2200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 2200 may include a UE 2202, which may include any mobile or non-mobile computing device designed to communicate with a RAN 2204 via an over-the-air connection. The UE 2202 may be communicatively coupled with the RAN 2204 by a Uu interface. The UE 2202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 2200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 2202 may additionally communicate with an AP 2206 via an over-the-air connection. The AP 2206 may manage a WLAN connection, which may serve to offload some/all network traffic from the RAN 2204. The connection between the UE 2202 and the AP 2206 may be consistent with any IEEE 802.11 protocol, wherein the AP 2206 could be a wireless fidelity (Wi-Fi®) router. In some embodiments, the UE 2202, RAN 2204, and AP 2206 may utilize cellular-WLAN aggregation (for example, LWA/LWIP). Cellular-WLAN aggregation may involve the UE 2202 being configured by the RAN 2204 to utilize both cellular radio resources and WLAN resources.

The RAN 2204 may include one or more access nodes, for example, AN 2208. AN 2208 may terminate air-interface protocols for the UE 2202 by providing access stratum protocols including RRC, PDCP, RLC, MAC, and L1 protocols. In this manner, the AN 2208 may enable data/voice connectivity between CN 2220 and the UE 2202. In some embodiments, the AN 2208 may be implemented in a discrete device or as one or more software entities running on server computers as part of, for example, a virtual network, which may be referred to as a CRAN or virtual baseband unit pool. The AN 2208 be referred to as a BS, gNB, RAN node, eNB, ng-eNB, NodeB, RSU, TRxP, TRP, etc. The AN 2208 may be a macrocell base station or a low power base station for providing femtocells, picocells or other like cells having smaller coverage areas, smaller user capacity, or higher bandwidth compared to macrocells.

In embodiments in which the RAN 2204 includes a plurality of ANs, they may be coupled with one another via an X2 interface (if the RAN 2204 is an LTE RAN) or an Xn interface (if the RAN 2204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 2204 may each manage one or more cells, cell groups, component carriers, etc. to provide the UE 2202 with an air interface for network access. The UE 2202 may be simultaneously connected with a plurality of cells provided by the same or different ANs of the RAN 2204. For example, the UE 2202 and RAN 2204 may use carrier aggregation to allow the UE 2202 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 2204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 2202 or AN 2208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 2204 may be an LTE RAN 2210 with eNBs, for example, eNB 2212. The LTE RAN 2210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 2204 may be an NG-RAN 2214 with gNBs, for example, gNB 2216, or ng-eNBs, for example, ng-eNB 2218. The gNB 2216 may connect with 5G-enabled UEs using a 5G NR interface. The gNB 2216 may connect with a 5G core through an NG interface, which may include an N2 interface or an N3 interface. The ng-eNB 2218 may also connect with the 5G core through an NG interface, but may connect with a UE via an LTE air interface. The gNB 2216 and the ng-eNB 2218 may connect with each other over an Xn interface.

In some embodiments, the NG interface may be split into two parts, an NG user plane (NG-U) interface, which carries traffic data between the nodes of the NG-RAN 2214 and a UPF 2248 (e.g., N3 interface), and an NG control plane (NG-C) interface, which is a signaling interface between the nodes of the NG-RAN 2214 and an AMF 2244 (e.g., N2 interface).

The NG-RAN 2214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 2202 can be configured with multiple BWPs where each BWP configuration has a different SCS. When a BWP change is indicated to the UE 2202, the SCS of the transmission is changed as well. Another use case example of BWP is related to power saving. In particular, multiple BWPs can be configured for the UE 2202 with different amount of frequency resources (for example, PRBs) to support data transmission under different traffic loading scenarios. A BWP containing a smaller number of PRBs can be used for data transmission with small traffic load while allowing power saving at the UE 2202 and in some cases at the gNB 2216. A BWP containing a larger number of PRBs can be used for scenarios with higher traffic load.

The RAN 2204 is communicatively coupled to CN 2220 that includes network elements to provide various functions to support data and telecommunications services to customers/subscribers (for example, users of UE 2202). The components of the CN 2220 may be implemented in one physical node or separate physical nodes. In some embodiments, NFV may be utilized to virtualize any or all of the functions provided by the network elements of the CN 2220 onto physical compute/storage resources in servers, switches, etc. A logical instantiation of the CN 2220 may be referred to as a network slice, and a logical instantiation of a portion of the CN 2220 may be referred to as a network sub-slice.

In some embodiments, the CN 2220 may be an LTE CN 2222, which may also be referred to as an EPC. The LTE CN 2222 may include MME 2224, SGW 2226, SGSN 2228, HSS 2230, PGW 2232, and PCRF 2234 coupled with one another over interfaces (or "reference points") as shown. Functions of the elements of the LTE CN 2222 may be briefly introduced as follows.

The MME 2224 may implement mobility management functions to track a current location of the UE 2202 to facilitate paging, bearer activation/deactivation, handovers, gateway selection, authentication, etc.

The SGW 2226 may terminate an S1 interface toward the RAN and route data packets between the RAN and the LTE CN 2222. The SGW 2226 may be a local mobility anchor point for inter-RAN node handovers and also may provide an anchor for inter-3GPP mobility. Other responsibilities may include lawful intercept, charging, and some policy enforcement.

The SGSN 2228 may track a location of the UE 2202 and perform security functions and access control. In addition, the SGSN 2228 may perform inter-EPC node signaling for mobility between different RAT networks; PDN and S-GW selection as specified by MME 2224; MME selection for handovers; etc. The S3 reference point between the MME 2224 and the SGSN 2228 may enable user and bearer information exchange for inter-3GPP access network mobility in idle/active states.

The HSS 2230 may include a database for network users, including subscription-related information to support the network entities' handling of communication sessions. The HSS 2230 can provide support for routing/roaming, authentication, authorization, naming/addressing resolution, location dependencies, etc. An S6a reference point between the HSS 2230 and the MME 2224 may enable transfer of subscription and authentication data for authenticating/authorizing user access to the LTE CN 2220.

The PGW 2232 may terminate an SGi interface toward a data network (DN) 2236 that may include an application/content server 2238. The PGW 2232 may route data packets between the LTE CN 2222 and the data network 2236. The PGW 2232 may be coupled with the SGW 2226 by an S5 reference point to facilitate user plane tunneling and tunnel management. The PGW 2232 may further include a node for policy enforcement and charging data collection (for example, PCEF). Additionally, the SGi reference point between the PGW 2232 and the data network 22 36 may be an operator external public, a private PDN, or an intra-operator packet data network, for example, for provision of IMS services. The PGW 2232 may be coupled with a PCRF 2234 via a Gx reference point.

The PCRF 2234 is the policy and charging control element of the LTE CN 2222. The PCRF 2234 may be communicatively coupled to the app/content server 2238 to determine appropriate QoS and charging parameters for service flows. The PCRF 2232 may provision associated rules into a PCEF (via Gx reference point) with appropriate TFT and QCI.

In some embodiments, the CN 2220 may be a 5GC 2240. The 5GC 2240 may include an AUSF 2242, AMF 2244, SMF 2246, UPF 2248, NSSF 2250, NEF 2252, NRF 2254, PCF 2256, UDM 2258, and AF 2260 coupled with one another over interfaces (or "reference points") as shown. Functions of the elements of the 5GC 2240 may be briefly introduced as follows.

The AUSF 2242 may store data for authentication of UE 2202 and handle authentication-related functionality. The AUSF 2242 may facilitate a common authentication framework for various access types. In addition to communicating with other elements of the 5GC 2240 over reference points as shown, the AUSF 2242 may exhibit an Nausf service-based interface.

The AMF 2244 may allow other functions of the 5GC 2240 to communicate with the UE 2202 and the RAN 2204 and to subscribe to notifications about mobility events with respect to the UE 2202. The AMF 2244 may be responsible for registration management (for example, for registering UE 2202), connection management, reachability management, mobility management, lawful interception of AMF-related events, and access authentication and authorization. The AMF 2244 may provide transport for SM messages between the UE 2202 and the SMF 2246, and act as a transparent proxy for routing SM messages. AMF 2244 may also provide transport for SMS messages between UE 2202 and an SMSF. AMF 2244 may interact with the AUSF 2242 and the UE 2202 to perform various security anchor and context management functions. Furthermore, AMF 2244 may be a termination point of a RAN CP interface, which may include or be an N2 reference point between the RAN 2204 and the AMF 2244; and the AMF 2244 may be a termination point of NAS (N1) signaling, and perform NAS ciphering and integrity protection. AMF 2244 may also support NAS signaling with the UE 2202 over an N3 IWF interface.

The SMF 2246 may be responsible for SM (for example, session establishment, tunnel management between UPF 2248 and AN 2208); UE IP address allocation and management (including optional authorization); selection and control of UP function; configuring traffic steering at UPF 2248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 2244 over N2 to AN 2208; and determining SSC mode of a session. SM may refer to management of a PDU session, and a PDU session or "session" may refer to a PDU connectivity service that provides or enables the exchange of PDUs between the UE 2202 and the data network 2236.

The UPF 2248 may act as an anchor point for intra-RAT and inter-RAT mobility, an external PDU session point of interconnect to data network 2236, and a branching point to support multi-homed PDU session. The UPF 2248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 2248 may include an uplink classifier to support routing traffic flows to a data network.

The NSSF 2250 may select a set of network slice instances serving the UE 2202. The NSSF 2250 may also determine allowed NSSAI and the mapping to the subscribed S-NSSAIs, if needed. The NSSF 2250 may also determine the AMF set to be used to serve the UE 2202, or a list of candidate AMFs based on a suitable configuration and possibly by querying the NRF 2254. The selection of a set of network slice instances for the UE 2202 may be triggered by the AMF 2244 with which the UE 2202 is registered by interacting with the NSSF 2250, which may lead to a change of AMF. The NSSF 2250 may interact with the AMF 2244 via an N22 reference point; and may communicate with another NSSF in a visited network via an N31 reference point (not shown). Additionally, the NSSF 2250 may exhibit an Nnssf service-based interface.

The NEF 2252 may securely expose services and capabilities provided by 3GPP network functions for third party, internal exposure/re-exposure, AFs (e.g., AF 2260), edge computing or fog computing systems, etc. In such embodiments, the NEF 2252 may authenticate, authorize, or throttle the AFs. NEF 2252 may also translate information exchanged with the AF 2260 and information exchanged with internal network functions. For example, the NEF 2252 may translate between an AF-Service-Identifier and an internal 5GC information. NEF 2252 may also receive information from other NFs based on exposed capabilities of other NFs. This information may be stored at the NEF 2252 as structured data, or at a data storage NF using standardized interfaces. The stored information can then be re-exposed by the NEF 2252 to other NFs and AFs, or used for other purposes such as analytics. Additionally, the NEF 2252 may exhibit an Nnef service-based interface.

The NRF 2254 may support service discovery functions, receive NF discovery requests from NF instances, and provide the information of the discovered NF instances to the NF instances. NRF 2254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 2254 may exhibit the Nnrf service-based interface.

The PCF 2256 may provide policy rules to control plane functions to enforce them, and may also support unified policy framework to govern network behavior. The PCF 2256 may also implement a front end to access subscription information relevant for policy decisions in a UDR of the UDM 2258. In addition to communicating with functions over reference points as shown, the PCF 2256 exhibit an Npcf service-based interface.

The UDM 2258 may handle subscription-related information to support the network entities' handling of communication sessions, and may store subscription data of UE 2202. For example, subscription data may be communicated via an N8 reference point between the UDM 2258 and the AMF 2244. The UDM 2258 may include two parts, an application front end and a UDR. The UDR may store subscription data and policy data for the UDM 2258 and the PCF 2256, and/or structured data for exposure and application data (including PFDs for application detection, application request information for multiple UEs 2202) for the NEF 2252. The Nudr service-based interface may be exhibited by the UDR 221 to allow the UDM 2258, PCF 2256, and NEF 2252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 2258 may exhibit the Nudm service-based interface.

The AF 2260 may provide application influence on traffic routing, provide access to NEF, and interact with the policy framework for policy control.

In some embodiments, the 5GC 2240 may enable edge computing by selecting operator/3$^{rd}$ party services to be geographically close to a point that the UE 2202 is attached to the network. This may reduce latency and load on the network. To provide edge-computing implementations, the 5GC 2240 may select a UPF 2248 close to the UE 2202 and execute traffic steering from the UPF 2248 to data network 2236 via the N6 interface. This may be based on the UE subscription data, UE location, and information provided by the AF 2260. In this way, the AF 2260 may influence UPF (re)selection and traffic routing. Based on operator deployment, when AF 2260 is considered to be a trusted entity, the network operator may permit AF 2260 to interact directly with relevant NFs. Additionally, the AF 2260 may exhibit an Naf service-based interface.

The data network 2236 may represent various network operator services, Internet access, or third party services that may be provided by one or more servers including, for example, application/content server 2238.

FIG. 23 schematically illustrates a wireless network 2300 in accordance with various embodiments. The wireless network 2300 may include a UE 2302 in wireless communication with an AN 2304. The UE 2302 and AN 2304 may be similar to, and substantially interchangeable with, likenamed components described elsewhere herein.

The UE 2302 may be communicatively coupled with the AN 2304 via connection 2306. The connection 2306 is illustrated as an air interface to enable communicative coupling, and can be consistent with cellular communications protocols such as an LTE protocol or a 5G NR protocol operating at mmWave or sub-6 GHz frequencies.

The UE 2302 may include a host platform 2308 coupled with a modem platform 2310. The host platform 2308 may include application processing circuitry 2312, which may be coupled with protocol processing circuitry 2314 of the modem platform 2310. The application processing circuitry 2312 may run various applications for the UE 2302 that source/sink application data. The application processing circuitry 2312 may further implement one or more layer operations to transmit/receive application data to/from a data network. These layer operations may include transport (for example UDP) and Internet (for example, IP) operations The protocol processing circuitry 2314 may implement one or more of layer operations to facilitate transmission or reception of data over the connection 2306. The layer operations implemented by the protocol processing circuitry 2314 may include, for example, MAC, RLC, PDCP, RRC and NAS operations.

The modem platform 2310 may further include digital baseband circuitry 2316 that may implement one or more layer operations that are "below" layer operations performed by the protocol processing circuitry 2314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 2310 may further include transmit circuitry 2318, receive circuitry 2320, RF circuitry 2322, and RF front end (RFFE) 2324, which may include or connect to one or more antenna panels 2326. Briefly, the transmit circuitry 2318 may include a digital-to-analog converter, mixer, intermediate frequency (IF) components, etc.; the receive circuitry 2320 may include an analog-to-digital converter, mixer, IF components, etc.; the RF circuitry 2322 may include a low-noise amplifier, a power amplifier, power tracking components, etc.; RFFE 2324 may include filters (for example, surface/bulk acoustic wave filters), switches, antenna tuners, beamforming components (for example, phase-array antenna components), etc. The selection and arrangement of the components of the transmit circuitry 2318, receive circuitry 2320, RF circuitry 2322, RFFE 2324, and antenna panels 2326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 2314 may include one or more instances of control circuitry (not shown) to provide control functions for the transmit/receive components.

A UE reception may be established by and via the antenna panels 2326, RFFE 2324, RF circuitry 2322, receive circuitry 2320, digital baseband circuitry 2316, and protocol processing circuitry 2314. In some embodiments, the antenna panels 2326 may receive a transmission from the AN 2304 by receive-beamforming signals received by a plurality of antennas/antenna elements of the one or more antenna panels 2326.

A UE transmission may be established by and via the protocol processing circuitry 2314, digital baseband circuitry 2316, transmit circuitry 2318, RF circuitry 2322, RFFE 2324, and antenna panels 2326. In some embodiments, the transmit components of the UE 2304 may apply a spatial filter to the data to be transmitted to form a transmit beam emitted by the antenna elements of the antenna panels 2326.

Similar to the UE 2302, the AN 2304 may include a host platform 2328 coupled with a modem platform 2330. The host platform 2328 may include application processing circuitry 2332 coupled with protocol processing circuitry 2334 of the modem platform 2330. The modem platform may further include digital baseband circuitry 2336, transmit circuitry 2338, receive circuitry 2340, RF circuitry 2342, RFFE circuitry 2344, and antenna panels 2346. The components of the AN 2304 may be similar to and substantially interchangeable with like-named components of the UE 2302. In addition to performing data transmission/reception as described above, the components of the AN 2308 may perform various logical functions that include, for example, RNC functions such as radio bearer management, uplink and downlink dynamic radio resource management, and data packet scheduling.

FIG. 24 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 24 shows a diagrammatic representation of hardware resources 2400 including one or more processors (or processor cores) 2410, one or more memory/storage devices 2420, and one or more communication resources 2430, each of which may be communicatively coupled via a bus 2440 or other interface circuitry. For embodiments where node virtualization (e.g., NFV) is utilized, a hypervisor 2402 may be executed to provide an execution environment for one or more network slices/subslices to utilize the hardware resources 2400.

The processors 2410 may include, for example, a processor 2412 and a processor 2414. The processors 2410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 2420 may include main memory, disk storage, or any suitable combination thereof. The memory/storage devices 2420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 2430 may include interconnection or network interface controllers, components, or other suitable devices to communicate with one or more peripheral devices 2404 or one or more databases 2406 or other network elements via a network 2408. For example, the communication resources 2430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 2450 may comprise software, a program, an application, an applet, an app, or other executable code for causing at least any of the processors 2410 to perform any one or more of the methodologies discussed herein. The instructions 2450 may reside, completely or partially, within at least one of the processors 2410 (e.g., within the processor's cache memory), the memory/storage devices 2420, or any suitable combination thereof. Furthermore, any portion of the instructions 2450 may be transferred to the hardware resources 2400 from any combination of the peripheral devices 2404 or the databases 2406. Accordingly, the memory of processors 2410, the memory/storage devices 2420, the peripheral devices 2404, and the databases 2406 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Examples

Example 1 may include communication system (6G system) with one or more of the following features:

Introduce three service planes: Compute Plane, Data Plane and Communication Plane to provide computing, data and communication services, respectively.

Introduce three function planes: Control plane (CP), User plane (UP), and Management Plane (MP) to provide control, user and management functions, respectively.

Each of the Compute Plane, Data Plane and Communication Plane has corresponding Control Plane functions, User Plane functions and Management Plane functions. The services provided by the service planes are achieved via CP functions, UP functions and MP functions.

Separate CP functions and UP functions with clear functional split. This is to allow CP functions and UP functions to scale independently.

Use service-based interface (SBI) to connect CP functions and some of the UP functions. Use dedicated high-speed transport to connect UP functions.

Use CP functions to discover/grant computing resources/services, chain up and configure computing and data service paths and functions, authorize access, etc.

Keep data in the UP functions and enable direct data access via configured data access path, minimize data movement.

Use management Plane to deploy/onboard new services, provision for new services, monitor performance, manage system failures, optimize system performance.

The communication system has the following functions:

The Compute Control Function (Comp CF) and the Compute Service Function (Comp SF) are part of the Compute Plane. Comp CF is a CP function and provide functionalities such as expose compute services to devices and other system functions, compute service request admission control and service establishment, identify and assign Comp SF for a computing service request, control and configure Comp SF, maintain compute service context and status, etc. Comp SF is a UP function and is the gateway for devices and other system functions to access computing services and resources. Functionalities of Comp SF include: parse computing service requests, direct requests to corresponding computing service endpoints, generate service request responses, generate charging data, report compute service status, etc.

The Data Control Function (Data CF) and the Data Service Function (Data SF) are part of the Data Plane. Data CF is a CP function and provides functionalities include: expose data services to devices and other system functions, data service request admission control and service establishment, identify and assign Data SF for a data service request, control and configure Data SF, maintain data service context and status, etc. Data SF is a UP function and provides functionalities include: parse data service request, direct requests to corresponding data service endpoints, generate service request responses, generate charging data, report data service status, etc.

The Communication Control Function (Comm CF), the Communication Service Function (Comm SF), the Central Unit Control Plane (CU-CP), the Central Unit User Plane (CU-UP) and the Distributed Unit (DU) are part of the Communication Plane. Specifically, CU-CP, CU-UP, and DU are part of the radio access network (RAN). The RAN functions provide protocols and services in support of computing and data plane services as well as conventional communication plane protocols and services. The Comp CF and Comp SF are part of the core network (CN) and provide CP and UP functions for data transport in the CN. To support computing and data plane services, service-aware transport can be enabled in Comp CF and Comp SF.

A Service Orchestration and Chaining Function (SOCF) is introduced to discovery and chain up services provided by functions in the network. A service pipeline is created by a chain of services. Workload processing and data movement can then be done within the service pipeline.

Additional service-specific CP functions can be defined to provide Compute Plane, Data Plane or Communication Plane services. Examples of such CP functions include: a network intelligent control function, a data ledger control function, etc.

All functions showed in the system architecture are logical functions. Physical instances of these functions can be instantiated in deployment.

Example 2 may include one or more elements of a system to provide the frontend service to enable computing service and resource discovery and association across cloud center, cloud edge and network edge as illustrated in FIG. 4. For example:

The in-network frontend service can be part of the services provided by SOCF.

An example procedure is shown in FIG. 5 and the corresponding description.

Example 3 may include one or more elements of a system to support dynamic device-network computing scaling. In some implementations of the example, this can be enabled by one of the approaches shown in FIG. 6 and FIG. 7. For example, the system of example 3 may include one or more of the following features:

In the first approach, the computing scaling is done in the service level (e.g., compute as service). Network Compute Plane provides computing services to mobile devices. A Client Compute Service Function is introduced in the mobile device side to interact with the Comp CF and Comp SF in network for computing services. The Client Compute Service Function operates as part of OS or as a platform application running on top of OS.

In the second approach, computing scaling is done in the resource level at below OS (e.g., compute as resource). The air interface is responsible for finding and scheduling computing resources. A Compute Resource Control and Scheduling entity is introduced in the air interface for this purpose. Among the scheduled remote computing units (e.g., AP or XPU in the mobile device and XPU or accelerator in the network), a Remote Computing Resource Engine is implemented in each of the computing unit for these remote computing resources to exchange computing instructions and messages.

These two approaches can co-exist in the system with each approach used for a set of scenarios and/or requirements.

Example procedures of these two approaches are shown in FIG. 8 and FIG. 9 and procedure descriptions therein.

The system supports RDMA (remote direct memory access) over radio

Two example scenarios for RDMA over radio as illustrated in FIG. 10 and FIG. 11. In the first scenario, RDMA queue pairs (QP) are established between computing devices in UE (e.g., application processor, XPUs) and network computing devices that connect to RAN units via PCIe (protocols such as CXL can run on top). The RAN services as the network I/O device for the computing devices in the network. In the second scenario, RDMA queue pairs are established between computing devices in UE (e.g., application processor, XPUs) and network computing devices that connect to RAN units via Ethernet. The RAN routes packets to the rNIC that services as the network I/O device for the computing devices.

The RDMA CM endpoints can be in host CPUs (as showed in FIG. 10 and FIG. 11) or offload to the radio modem.

The RDMA connection manager (CM) messages for QP establishment can be carried via radio CP signaling between UE and network. The radio interface module can then map the RDMA CM message to proper control signal transport path towards the computing host device where the RDMA CM locates.

The RDMA message transportation can be via UP radio bearers. The MAC layer can be made aware on logical channels that carry RDMA message transport and perform flow control and rate adaption accordingly. The RDMA control protocol, which handles traffic monitoring, rate adaption, congestion control in the RDMA layer can be enhanced to achieve end-to-end flow control.

Control plane and user plane protocol stacks as showed in FIG. 12 and FIG. 13

The system supports cloud workload offloading

The example procedure in FIG. 14 and the corresponding descriptions.

The system supports computing-embedded air interface with the following functionalities Signaling for computing/data service and resource discovery. Information on computing/data services and resources that the 6G system provides can be incorporated in the system information signaling in the air interface. The system information can be broadcasted to UEs or provided on demand.

Signaling for compute/data service establishment. In the service establishment stage, UE's service compute/data initial service requests will be carried in the CP signaling over the air interface. The RAN receives the CP signaling and route the service request messages to proper endpoints. When the service request is for computing/data resources, the message is terminated at the RAN. The RAN will schedule computing/data resources in response to the request as illustrated in FIG. 9. When the service request is for computing/data services, the request message is forwarded to the SOCF for service discovery, orchestration, and chaining.

Establish radio bearers for transport compute/data message exchanges between UE and service endpoints. As the 6G system provides three service planes (e.g., Compute Plane, Data Plane, Communication Plane), UP data for the three service planes may have different termination points and communication QoS requirements, e.g., UP data for Computation Plane services may terminate at Comp SF, UP data for Data Plane services may terminate at Data SF, UP data for Communication Plane services may terminate at the cloud. In order for the RAN to steer UP data towards different service end points and provide required radio transmission QoS, proper radio bearers need to be established. When UP traffics towards different service endpoints can be multiplexed onto a same radio bearer, a service identifier can be introduced to identify the different service UP traffic flows.

Compute-aware resource scheduling. In the "Compute as Service" approach for UE-network computing, the RAN holds both radio resource and computing resource. The radio resource scheduling and the computing resource scheduling can therefore leverage information from each other when scheduling radio and computing resources. For instance, knowing a computing task is scheduled to complete execution at a time slot, the radio scheduler can pre-schedule radio resource at the time slot for transmission of the execution results. To achieve this feature, explicit or implicit information sharing between computing resource scheduler and radio resource scheduler is needed. In RDMA over radio, the MAC can be made aware on the logical channels carrying RDMA messages so that it can perform rate adaption accordingly.

The system supports service chain aware transport based on the following two schemes:

Scheme 1: MPLS-type scheme. In this scheme, each data flow is identified by a flow ID (or a label). The SOCF chains up the transportation path as well as computation and data services along the path. The Comm SFs, Comp SFs and Data SFs in the transportation and service path are configured accordingly by their respective Comm CF, Comp CF and Data CF. For each data flow, each Comm SF in the transportation path forwards packets of the data flow to configured Comp CF, Data CF or Comm SF following the service chain.

Scheme 2: Segment routing-based scheme. In this scheme, each packet carries a set of labels that identifies the service chain for the packet. The labels are created based on the service chain configuration (as configured by SOCF) and inserted to each packet at the entrance point of a service segment. In the case that the mobile network transport is a single service segment, the entrance points are the RAN UP function and the Comm SF interfacing with the cloud. In the case that multiple service segments are defined in the mobile network transport, the entrance points are the Communication Plane UP functions at the two ends of a service segment. To generate those service labels, service segment entrance points receives service chain configurations from SOCF and generate labels for packets accordingly. Upon receiving a packet, a Comm SF read the first label of the packet, remove this first label from the packet, and forwards packet to corresponding Comm SF or Data SF or Comm SF as identified by the service label.

FIG. 15 illustrates an example of the service chain aware transport

The system support AI capabilities

AI/ML for communication. This is to provide AI/ML services to Communication Plane functions. Examples include AI/ML-assisted network operation and automation, AI-assisted air interface.

Communication for AI/ML. This is to use Communication Plane functions to help address AI/ML computing and data related problems, such as distribute AI learning/inference workload among UEs and network, enable privacy-preserving in-network data preprocessing, etc.

FIG. 16 and the corresponding descriptions show an example procedure for AI/ML-assisted RAN operation FIG. 17 and the corresponding descriptions shows an example procedure for distributed machine learning between UE and network.

Example 4 includes an electronic device comprising: one or more processors; and one or more non-transitory computer-readable media comprising instructions that, upon execution of the instructions, are to implement a logical entity of a core network (CN) of a cellular network, wherein the logical entity is to: identify, from a base station of the cellular network, a service request related to a service of the cellular network that is to be provided to a service subscriber of the cellular network; identify an indication of the service in a cloud service registry function of the network; identify, based on the indication of the service, service endpoints related to the service; and provide, to the base station, an indication of the service endpoints.

Example 5 includes the electronic device of example 4, and/or some other example herein, wherein the service subscriber is a user equipment (UE) or an application provider.

Example 6 includes the electronic device of any of examples 4-5, and/or some other example herein, wherein the logical entity is a service orchestration and chaining function (SOCF).

Example 7 includes the electronic device of any of examples 4-6, and/or some other example herein, wherein the logical entity is further to identify an indication of the service from a compute plane control function (CF) or a data plane CF.

Example 8 includes the electronic device of example 7, and/or some other example herein, wherein the logical entity is to: identify the indication of the service in the cloud service registry function if the service is provided by a cloud-based entity that is communicatively coupled with the network; and identify the indication of the service from the compute plane CF or the data plane CF if the service is provided by an entity of the network.

Example 9 includes the electronic device of example 8, and/or some other example herein, wherein the entity of the network is a compute plane service function (SF) or a data plane SF of the network.

Example 10 includes the electronic device of any of examples 4-9, and/or some other example herein, wherein the logical entity is further to establish a service transport between the service endpoints through a communication plane service function (SF).

Example 11 includes the electronic device of any of examples 4-10, and/or some other example herein, wherein the base station is a base station of a sixth generation (6G) network.

Example 12 includes a base station of a cellular network, wherein the base station comprises: one or more processors; and one or more non-transitory computer-readable media comprising instructions that, upon execution of the instructions by the one or more processors, are to cause the base station to: identify, from a user equipment (UE) of the 6G cellular network, a request for one or more network-based compute resources; identify, based on the request, one or more network-based compute resources; and provide, to the UE, an indication of the one or more network-based compute resources.

Example 13 includes the base station of example 12, and/or some other example herein, wherein the instructions are further to cause the base station to: transmit, to a service orchestration and chaining function (SOCF) of the 6G network based on the request from the UE, a request for a computing resource; and identify, from the SOCF, the indication of the one or more network-based compute resources.

Example 14 includes the base station of example 13, and/or some other example herein, wherein the one or more network-based compute resources are related to a compute plane control function (CF) or a compute plane service function (SF).

Example 15 includes the base station of example 14, and/or some other example herein, wherein the instructions are further to cause the base station to facilitate service session establishment with the compute plane CF related to use of the one or more network-based compute resources.

Example 16 includes the base station of any of examples 12-15, and/or some other example herein, wherein the base station is to allocate, based on the request for one or more network-based compute resources, the one or more network-based compute resources for use by the UE.

Example 17 includes the base station of example 16, and/or some other example herein, wherein the one or more network-based compute resources are identified by the base station prior to receipt of the request for the one or more network-based compute resources.

Example 18 includes the base station of any of examples 12-17, and/or some other example herein, wherein the cellular network is a sixth generation (6G) cellular network.

Example 19 includes a user equipment (UE) of a cellular network, wherein the UE comprises: one or more processors; and one or more non-transitory computer-readable media comprising instructions that, upon execution of the instructions by the one or more processors, are to cause the UE to: establish, with a base station of the cellular network, a remote direct memory access (RDMA) connection; and transmit one or more RDMA messages to the base station.

Example 20 includes the UE of example 19, and/or some other example herein, wherein the RDMA messages are to facilitate direct data placement in an application memory buffer of a device that is communicatively coupled with the base station.

Example 21 includes the UE of example 20, and/or some other example herein, wherein the device is communicatively coupled with the base station by a peripheral component interconnect express (PCIe) connection or an Ethernet connection.

Example 22 includes the UE of any of examples 19-21, and/or some other example herein, wherein the RDMA connection involves RDMA queue pair (QP) establishment between the UE and the base station.

Example 23 includes the UE of any of examples 19-22, and/or some other example herein, wherein transmission of the one or more RDMA messages includes mapping one or more RDMA protocol fields into a radio layer protocol field of an air interface connection between the UE and the base station.

Example 24 includes the UE of any of examples 19-22, and/or some other example herein, wherein the cellular network is a sixth generation (6G) cellular network.

Example 25 includes an electronic device comprising: one or more processors; and one or more non-transitory computer-readable media comprising instructions that, upon execution of the instructions by the one or more processors, are to cause a user plane (UP) network function to: identify a flow identity or packet label of a UP packet; and process the UP packet based on the flow identity or packet label.

Example 26 includes the electronic device of example 25, and/or some other example herein, wherein processing the UP packet includes forwarding the UP packet based on the flow identity or packet label.

Example 27 includes the electronic device of any of examples 25-26, and/or some other example herein, wherein the packet label includes an indication of how the UP packet is to be processed.

Example 28 includes the electronic device of any of examples 25-27, and/or some other example herein, wherein the UP network function is a base station UP function or a core network UP function.

Example 29 includes the electronic device of any of examples 25-28, and/or some other example herein, wherein the UP network function is pre-configured with information related to processing the UP packet based on the flow identity or the packet label of the UP packet.

Example 30 includes the electronic device of example 29, and/or some other example herein, wherein the information related to processing the UP packet includes information related to inserting or removing a packet label of the UP packet.

Example Z01 may include an apparatus comprising means to perform one or more elements of a method described in or related to any of examples 1-30, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example Z03 may include an apparatus comprising logic, modules, or circuitry to perform one or more elements of a method described in or related to any of examples 1-30, or any other method or process described herein.

Example Z04 may include a method, technique, or process as described in or related to any of examples 1-30, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-30, or portions thereof.

Example Z06 may include a signal as described in or related to any of examples 1-30, or portions or parts thereof.

Example Z07 may include a datagram, packet, frame, segment, protocol data unit (PDU), or message as described in or related to any of examples 1-30, or portions or parts thereof, or otherwise described in the present disclosure.

Example Z08 may include a signal encoded with data as described in or related to any of examples 1-30, or portions or parts thereof, or otherwise described in the present disclosure.

Example Z09 may include a signal encoded with a datagram, packet, frame, segment, protocol data unit (PDU), or message as described in or related to any of examples 1-30, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-30, or portions thereof.

Example Z11 may include a computer program comprising instructions, wherein execution of the program by a processing element is to cause the processing element to carry out the method, techniques, or process as described in or related to any of examples 1-30, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

US 12,574,304 B2

29

| 3GPP | Third Generation Partnership Project |
| 4G | Fourth Generation |
| 5G | Fifth Generation |
| 5GC | 5G Core network |
| AC | Application Client |
| ACR | Application Context Relocation |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CDR | Charging Data Request |
| CDR | Charging Data Response |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |

30

-continued

| CS | Circuit Switched |
| CSCF | call session control function |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| EAS | Edge Application Server |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance Management Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |

-continued

| | |
|---|---|
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |

-continued

| | |
|---|---|
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |

-continued

| | |
|---|---|
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |
| mMTCmassive | MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |

| | |
|---|---|
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System |

-continued

| | Information |
| --- | --- |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time Rx Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |

-continued

| SS | Synchronization Signal |
| --- | --- |
| SSB | Synchronization Signal Block |
| SSID | Service Set Identifier |
| SS/PBCH | SS/PBCH Block Resource Indicator, Synchronization |
| Block SSBRI | Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, VLAN Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |

37

-continued

| VNFM | VNF Manager |
| VoIP | Voice-over-IP, Voice-over- Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. An electronic device comprising:
one or more processors; and
one or more non-transitory computer-readable media comprising instructions that, upon execution of the instructions, are to implement a service orchestration and chaining function (SOCF) as a logical entity of a sixth generation (6G) core network (CN) of a cellular network, wherein the logical entity is to:
identify, from a base station of the cellular network, a service request related to a service of the cellular network that is to be provided to a service subscriber of the cellular network;
identify an indication of the service in a cloud service registry function of the cellular network;
identify, based on the indication of the service, service endpoints related to the service;
establish a service chain comprising a sequence of service functions for the service;
provide, to the base station, an indication of the service endpoints; and
configure a service chain aware transport path for the service between the base station and the service endpoints, the service chain aware transport path determined based on the service chain and configured to route data through the sequence of service functions in the service chain.

2. The electronic device of claim 1, wherein the service subscriber is a user equipment (UE) or an application provider.

3. The electronic device of claim 1, wherein the logical entity is further to:
determine, based on the service request, whether the service is provided by a cloud-based entity or a network-based entity, and
perform service discovery in the cloud service registry function in response to the service being cloud-based and in a compute plane control function (CF) or data plane CF in response to the service being network-based, the service chain including at least one of a compute plane service function (SF), a data plane SF, or a communication plane SF.

4. The electronic device of claim 1, wherein the logical entity is further to dynamically reconfigure the service chain in response to changes in network conditions, service availability, and subscriber requirements.

5. The electronic device of claim 1, wherein the logical entity is further to generate and assign a unique service chain identifier to each established service chain for transport path configuration and data flow management.

6. The electronic device of claim 1, wherein the service chain aware transport path is implemented using segment routing, multiprotocol label switching (MPLS), the MPLS being a label-based forwarding mechanism.

7. The electronic device of claim 1, wherein the logical entity is further to monitor performance metrics of the service chain and adjust the service chain or the service chain aware transport path based on the performance metrics.

8. The electronic device of claim 1, wherein the logical entity is further to:
authenticate and authorize service requests based on subscriber identity, service type, and network policy,
instantiate service chain instantiation across multiple administrative domains and network slices, and
initiate service chain migration and failover in response to node failures and network disruption.

9. A base station, wherein the base station comprises:
one or more processors; and
one or more non-transitory computer-readable media
comprising instructions that, upon execution of the
instructions by the one or more processors, are to cause
the base station to:
  identify, from a user equipment (UE), a request for one
    or more network-based compute resources;
  identify, based on the request, one or more network-
    based compute resources;
  establish, in cooperation with a service orchestration
    and chaining function (SOCF) of a sixth generation
    (6G) core network, a service chain comprising a
    sequence of service functions for the request;
  configure a service chain aware transport path for the
    UE between the base station and the compute
    resources, the service chain aware transport path
    determined based on the service chain and config-
    ured to route data through the sequence of service
    functions in the service chain; and
  provide, to the UE, an indication of the one or more
    network-based compute resources.

10. The base station of claim 9, wherein the service chain
comprises at least one compute plane service function, one
data plane service function, and one communication plane
service function, each instantiated in a different administra-
tive domain.

11. The base station of claim 10, wherein the service chain
aware transport path is implemented using segment routing,
and the instructions are further to cause the base station to
insert a sequence of segment identifiers into data packets to
enforce traversal of the service functions in the service
chain.

12. The base station of claim 11, wherein the instructions
are further to cause the base station to monitor performance
metrics of the service chain and dynamically reconfigure the
service chain or the service chain aware transport path in
response to changes in network conditions or service
requirements based on the performance metrics.

13. The base station of claim 9, wherein:
the instructions are further to cause the base station to
  allocate, based on the request for one or more network-
  based compute resources, the one or more network-
  based compute resources for use by the UE; and
the one or more network-based compute resources are
  identified by the base station prior to receipt of the
  request for the one or more network-based compute
  resources.

14. The base station of claim 9, wherein the instructions
are further to cause the base station to generate and assign a unique service chain identifier to each established service
chain for transport path configuration and data flow man-
agement.

15. A user equipment (UE), wherein the UE comprises:
memory to store one or more remote direct memory
  access (RDMA) messages; and
one or more processors to:
  establish, with a base station of a sixth generation (6G)
    cellular network and in cooperation with a service
    orchestration and chaining function (SOCF) of a 6G
    core network, a RDMA connection, the RDMA
    connection associated with a service chain compris-
    ing a sequence of service functions for the UE; and
  transmit the one or more RDMA messages to the base
    station, the one or more RDMA messages transmit-
    ted over a service chain aware transport path con-
    figured to route data through the sequence of service
    functions in the service chain.

16. The UE of claim 15, wherein:
the one or more RDMA messages are to facilitate direct
  data placement in an application memory buffer of a
  device that is communicatively coupled with the base
  station,
the service chain aware transport path is implemented
  using multiprotocol label switching (MPLS), and
the UE is configured to include a label stack in RDMA
  messages to enforce service function traversal.

17. The UE of claim 16, wherein the service chain is
selected based on a policy or service level agreement (SLA)
associated with the UE or an application provider.

18. The UE of claim 15, wherein:
the RDMA connection involves RDMA queue pair (QP)
  establishment between the UE and the base station, and
transmission of the one or more RDMA messages
  includes mapping one or more RDMA protocol fields
  into a radio layer protocol field of an air interface
  connection between the UE and the base station.

19. The UE of claim 15, wherein the UE is further
configured to:
provide telemetry data regarding RDMA message latency
  and throughput to the SOCF for service chain selection
  and service chain aware transport path configuration
  manipulation, and
receive, from the SOCF, updates to the service chain or
  the service chain aware transport path in response to
  detected node failures or network disruptions, and in
  response migrate the RDMA connection to an updated
  path.

* * * * *